(12) United States Patent
Kong et al.

(10) Patent No.: US 11,706,199 B2
(45) Date of Patent: Jul. 18, 2023

(54) ELECTRONIC DEVICE AND METHOD FOR GENERATING ATTESTATION CERTIFICATE BASED ON FUSED KEY

(71) Applicant: Samsung Electronics Co., Ltd., Gyeonggi-do (KR)

(72) Inventors: Sunjune Kong, Gyeonggi-do (KR); Bumhan Kim, Gyeonggi-do (KR); Jinhyoung Kim, Gyeonggi-do (KR); Sunghoon Yoo, Gyeonggi-do (KR); Byeonghwa Kim, Gyeonggi-do (KR); Jeongil Kim, Gyeonggi-do (KR); Mincheol Jung, Gyeonggi-do (KR)

(73) Assignee: Samsung Electronics Co., Ltd

( * ) Notice: Subject to any disclaimer, the term of this patent is extended or adjusted under 35 U.S.C. 154(b) by 330 days.

(21) Appl. No.: 16/985,503

(22) Filed: Aug. 5, 2020

(65) Prior Publication Data
US 2021/0044575 A1    Feb. 11, 2021

(30) Foreign Application Priority Data
Aug. 6, 2019    (KR) ......................... 10-2019-0095769

(51) Int. Cl.
*H04L 9/40*    (2022.01)
*H04L 9/08*    (2006.01)
*H04L 67/01*    (2022.01)

(52) U.S. Cl.
CPC ........ *H04L 63/0428* (2013.01); *H04L 9/0866* (2013.01); *H04L 63/065* (2013.01); *H04L 63/0823* (2013.01); *H04L 67/01* (2022.05)

(58) Field of Classification Search
CPC ............... H04L 63/0428; H04L 63/065; H04L 63/0823; H04L 67/01; H04L 9/0866;
(Continued)

(56) References Cited

U.S. PATENT DOCUMENTS 7,913,086 B2 *    3/2011    Kostiainen ............ H04L 9/0877
                                                    713/176
8,639,915 B2 *    1/2014    Graunke ............... H04L 9/0877
                                                    380/279
(Continued)

FOREIGN PATENT DOCUMENTS

VA    WO 2019/029817    2/2019
WO    WO 2014/099687    6/2014

OTHER PUBLICATIONS

Search Query Report from IP.com (performed Aug. 26, 2022) (Year: 2022).*

(Continued)

*Primary Examiner* — Sharon S Lynch
(74) *Attorney, Agent, or Firm* — The Farrell Law Firm, P.C.

(57) ABSTRACT

An electronic device and method of operating an electronic device are provided. The electronic device includes an integrated circuit including at least one key, at least one processor including the integrated circuit, and a memory operatively connected to the at least one processor. The memory stores instructions that, when executed, cause the at least one processor to obtain at least one piece of hardware information related to the electronic device, generate a signed certificate signing request including the at least one piece of hardware information, based on the at least one key, transmit the signed certificate signing request to an external electronic device, receive an attestation certificate generated based on the signed certificate signing request, from the external electronic device, and store the received attestation certificate in the memory.

17 Claims, 13 Drawing Sheets

(58) Field of Classification Search
CPC ... H04L 9/0897; H04L 9/3247; H04L 9/3268; H04L 9/0825; H04L 9/0894; H04L 9/3263; H04W 12/04; H04W 12/069; H04W 12/48; H04W 12/71; G06F 21/602; G06F 21/64

See application file for complete search history.

(56) References Cited

U.S. PATENT DOCUMENTS

| | | | | |
|---|---|---|---|---|
| 9,681,305 | B2* | 6/2017 | Colegate | G06Q 20/4016 |
| 9,917,687 | B2* | 3/2018 | Wooten | G06F 8/65 |
| 10,193,697 | B1 | 1/2019 | Jackson et al. | |
| 10,447,486 | B2* | 10/2019 | Turissini | G06F 21/31 |
| 10,708,067 | B2* | 7/2020 | Scarlata | H04L 9/14 |
| 10,819,696 | B2* | 10/2020 | Sinha | G06F 21/73 |
| 11,388,012 | B2* | 7/2022 | Loreskar | G06F 21/53 |
| 11,489,678 | B2* | 11/2022 | Scarlata | H04L 9/14 |
| 2008/0320308 | A1* | 12/2008 | Kostiainen | H04L 63/123 |
| | | | | 713/171 |
| 2010/0138907 | A1* | 6/2010 | Grajek | H04L 63/0823 |
| | | | | 709/217 |
| 2010/0183154 | A1* | 7/2010 | Graunke | H04L 9/0827 |
| | | | | 380/278 |
| 2015/0178226 | A1* | 6/2015 | Scarlata | G06F 12/1466 |
| | | | | 711/163 |
| 2017/0093586 | A1* | 3/2017 | Miranda | H04W 12/04 |
| 2017/0104580 | A1* | 4/2017 | Wooten | H04L 9/0869 |
| 2017/0270509 | A1* | 9/2017 | Colegate | H04L 63/061 |
| 2017/0366359 | A1* | 12/2017 | Scarlata | H04L 9/14 |
| 2019/0020647 | A1* | 1/2019 | Sinha | G06F 21/33 |
| 2019/0028281 | A1* | 1/2019 | Turissini | G06F 21/57 |
| 2020/0159966 | A1* | 5/2020 | Sibert | H04L 9/14 |
| 2020/0259668 | A1* | 8/2020 | Loreskar | G06F 21/53 |
| 2020/0396217 | A1* | 12/2020 | Sinha | G06F 21/57 |

OTHER PUBLICATIONS

Search Query Report from IP.com (performed Feb. 16, 2023) (Year: 2023).*

Alon Jackson, "Trust is in the Keys of the Beholder: Extending SGX Autonomy and Anonymity", Efi Arazi School of Computer Science, May 2017, 85 pages.

Victor Costan et al., "Secure Processors Part II" Intel SGX Security Analysis and MIT Sanctum Architecture, Nov. 3, 2017, 116 pages.

International Search Report dated Nov. 25, 2020 issued in counterpart application No. PCT/KR2020/010395, 10 pages.

Key and ID Attestation, https://source.android.com/security/keystore/attestation, Jun. 30, 2020, pp. 14.

Anonymous, "Manufacturer Origin Attestation for Device User Authorization", IP.Com, XP013176809, Dec. 11, 2017, 9 pages.

European Search Report dated Jul. 11, 2022 issued in counterpart application No. 20850733.5-1218, 9 pages.

* cited by examiner

ELECTRONIC DEVICE AND METHOD FOR GENERATING ATTESTATION CERTIFICATE BASED ON FUSED KEY

CROSS-REFERENCE TO RELATED APPLICATION(S)

This application is based on and claims priority under 35 U.S.C. § 119 to Korean Patent Application No. 10-2019-0095769, filed on Aug. 6, 2019, in the Korean Intellectual Property Office, the disclosure of which is incorporated herein by reference in its entirety.

BACKGROUND

1. Field

The present disclosure relates generally to an electronic device and method for generating an attestation certificate, based on a fused key.

2. Description of Related Art

Device attestation is a method of verifying that the hardware and/or software of an electronic device has not been changed. The device attestation may prevent an electronic device from acting as another electronic device by changing the hardware ID of the electronic device and transmitting the same to an external electronic device that requests attestation, and the external electronic device may determine that the hardware and/or software is changed after the electronic device is manufactured.

An attestation certificate associated with device attestation may be generated by signing hardware information of an electronic device using an attestation key generated. in an external electronic device at manufacturing. Accordingly, there is no association between the attestation key and the hardware information. For the above reason, if an attacker obtains an attestation key, an attestation certificate can be newly issued, which is a drawback.

SUMMARY

The present disclosure has been made to address at least the disadvantages described above and to provide at least the advantages described below.

In accordance with an aspect of the present disclosure, an electronic device is provided. The electronic device includes an integrated circuit including at least one key, at least one processor including the integrated circuit, and a memory operatively connected to the at least one processor. The memory stores instructions that, when executed, cause the at least one processor to obtain at least one piece of hardware information related to the electronic device, generate a signed certificate signing request including the at least one piece of hardware information, based on the at least one key, transmit the signed certificate signing request to an external electronic device, receive an attestation certificate generated based on the signed certificate signing request, from the external electronic device, and store the received attestation certificate in the memory.

In accordance with an aspect of the present disclosure, a method of operating an electronic device is provided. The method includes identifying at least one piece of hardware information related to the electronic device, generating a signed certificate signing request including the at least one piece of hardware information, based on at least one key, transmitting the signed certificate signing request to an external electronic device, receiving an attestation certificate generated based on the signed certificate signing request, from the external electronic device, and storing the received attestation certificate in the memory.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1:
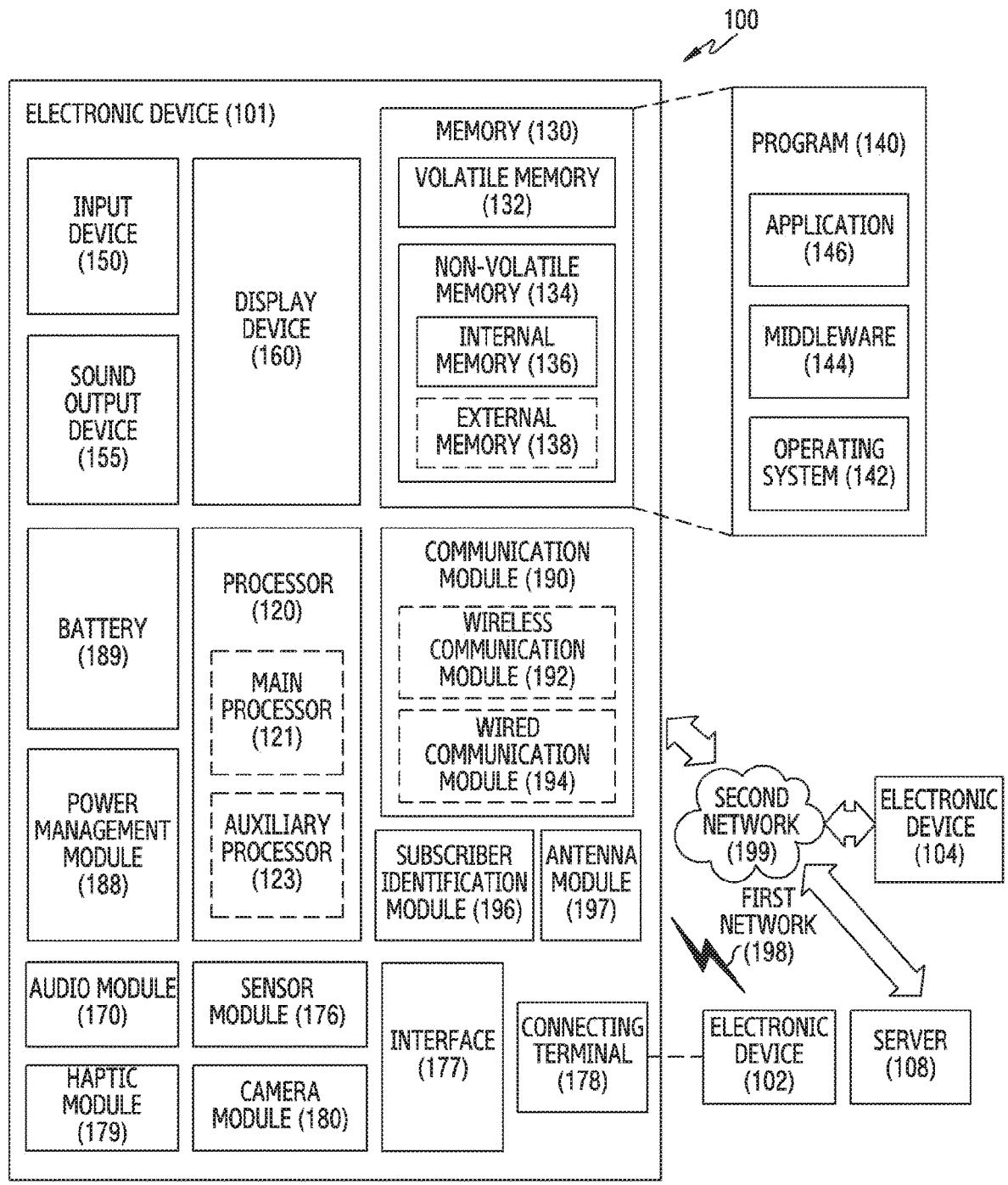
FIG. 1 is a block diagram illustrating an electronic device in a network environment, according to various embodiments.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. Terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™) a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" indicates a person using an electronic device or a device (e.g., an artificial intelligence electronic device) using an electronic device.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

It should be appreciated that an embodiment of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

The terms "have," "may have," "include," and "may include" as used herein indicate the presence of corresponding features (for example, elements such as numerical values, functions, operations, or parts), and do not preclude the presence of additional features.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment as set forth herein may be implemented as software (e.g., the program 110) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, according to an embodiment, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
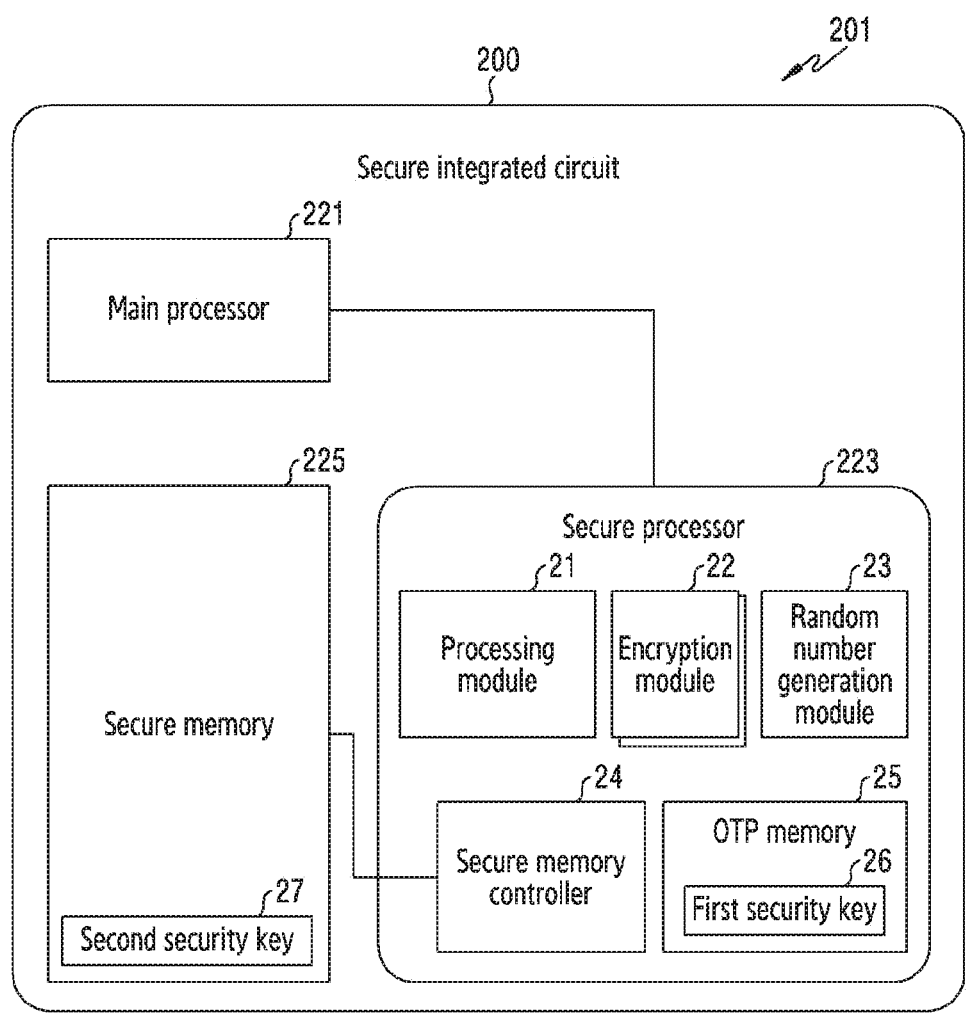
FIG. 2 is a block diagram of a secure integrated circuit of an electronic device, according to an embodiment.

FIG. 2 is a block diagram of a secure integrated circuit of an electronic device, according to an embodiment.

Referring to FIG. 2, an electronic device 201 (e.g., the electronic device 101) may include a secure integrated circuit (IC) 200 of a system on chip (SoC) that provides a normal execution environment (rich execution environment (REE)), a trusted execution environment (TEE), and a secure execution environment (SEE). The TEE or the SEE may have a higher security level than the REE that requires a normal security level. The TEE or SEE may be an environment in which a program (e.g., the program 110) operates based on a resource that is different from a resource allocated to the REE. The TEE or the SEE may not allow access to a resource allocated to the TEE or SEE via a program that is not allowed in the TEE or SEE. The SEE may have a higher security level than that of the TEE. The SEE or TEE may be an execution environment which is divide in terms of software, as opposed to a physically divided execution environment. An operating system (e.g., the operating system 112) that operates in the electronic device 201 may provide a service via a normal application in an REE, and if the operating system performs an operation that requires high security and high reliability, the operating system may change to the SEE or the TEE, and may separately run an application for providing a service that requires reliability. If the electronic device 201 performs financial transaction or performs a function that requires reliability, such as authenticating a user fingerprint, inputting passwords, or authenticating passwords, the electronic device 201 may run a biometric authentication application that operates in the TEE or SEE, and may authenticate a user. The SEE or TEE may be a physically divided execution environment. The electronic device 201 may provide a function that requires high security to a user via a secure memory 225 in which a separate secure area is established or via an environment separated in terms of hardware in a secure processor 223. A main processor 221 may include a plurality of core processors. Depending on the type of application used in the electronic device 201, the main processor 221 may run an application by selecting at least one of the plurality of core processors. In the case of a normal mode (e.g., REE), the electronic device 201 may run a normal application by selecting some of the core processors of the main processor 221. In the case of a mode that requires security (e.g., SEE or TEE), the electronic device 201 may access a secure area using a secure core processor, instead of a normal core processor, and may run a secure application.

The secure integrated circuit 200 may include the main processor 221 (e.g., the main processor 121), the secure processor 223 (e.g., the sub-processor 123), and the secure memory 225.

The main processor 221 may operate in the REE, the TEE, or a combination thereof. The main processor 221 may control data processing and an operation thereof in the REE and/or TEE.

The secure processor 223 may be operatively connected to the main processor 221, and may perform communication. The secure processor 223 may receive a request for operating or initializing the SEE, from the main processor 221. The secure processor 223 may operate in the SEE. The secure processor 223 may control security (e.g., encryption) of data using a first security key 26. The first security key 26 may be stored in a onetime programmable (OTP) memory 25. The first security key 26 may be stored in the security integrated circuit 200 in a manner of being fused. The first security key 26 may be stored in the secure integrated circuit 200 in a manner of being fused, by changing the physical configuration of the secure integrated circuit 200 so that the physical configuration of the secure integrated circuit 200 indicates a binary data sequence corresponding to the first security key 26. The circuit lines corresponding to the physical configuration of the security integrated circuit 200 may indicate "0" or "1" by selectively disconnecting the corresponding circuit lines, and thus, the physical configuration of the security integrated circuit 200 may indicate the binary data sequence corresponding to the first security key 26. If the first security key 26 is a data sequence of "0101001", first, third, fifth, and sixth circuit lines among the seven circuit lines corresponding to the physical configuration of the secure integrated circuit 200 may be disconnected and thus, the seven circuit lines corresponding to the physical configuration of the secure integrated circuit 200 may indicate the data sequence of "0101001". When the secure integrated circuit 200 is manufactured, some of the circuit lines included in the secure integrated circuit 200 may be selectively disconnected in order to indicate a binary data sequence corresponding to the first security key 26, and thus, the first security key 26 may be stored in the secure integrated circuit 200 in a manner of being fused.

The secure processor 223 may include a processing module 21, an encrypting module 22, a random number generation module 23, a secure memory controller 24, an OTP memory 25, or a combination thereof.

The processing module 21 may control overall operation of the secure processor 223. The processing module 21 may control a security key generation procedure and a secure communication (or cipher communication) procedure.

The encryption module 22 may encrypt data that requires security. The encryption module 22 may encrypt data using the first security key 26, if a secure application (e.g., an application such as Samsung Pay™) that operates in the SEE requests storing data.

The encryption module 22 may sign data that requires signing. The encryption module 22 may sign data using the first security key 26, if a secure application (e.g., an application such as Samsung Pay™) that operates in the SEE requires signing data. A sign provided to data may be an electronic signature provided using the first security key 26 as a private key. Signing data may include an operation of generating a public key corresponding to a private key, and electronically signing data using the private key and the public key.

The random number generation module 23 may generate a random number. The random number generation module 23 may generate a random number in entropy (e.g., a 256-bit random number) that the secure processor 223 needs. The generated random number may be used for generating a key. Entropy may be randomness which may be a seed of generation of a random number in order to secure randomness. As entropy is higher, the predictability of a generated random number may be low and the probability of redundancy may be low.

The secure memory controller 24 may control the secure memory 225. The secure memory controller 24 may record a second security key 27 in the secure memory 225, or may transmit encrypted data to the secure memory 225.

The OTP memory 25 may be a non-volatile memory (NVM) in which data is recorded once. The OTP memory 25 may store the first security key 26. A bit indicating whether the first security key 26 is recorded may be recorded in a designated area of the OTP memory 25.

The secure processor 223 may further include various configurations. The secure processor 223 may further include a secure cache, ROM, RAM, a memory controller, security sensors, or a combination thereof.

The secure memory 225 may be operatively connected to the secure processor 223. The secure memory 225 may perform encryption communication using a key shared in advance with the secure processor 223. The secure memory 225 may store the second security key 27 corresponding to the first security key 26. A key stored in the secure memory 225 may be a key generated based on a random number generated by the random number generation module 23. The secure memory 225 may be an NVM.

Although FIG. 2 illustrates that the encryption module 22 and the random number generation module 23 are included in the secure processor 223, this is merely an example. The encryption module 22, the random number generation module 23, or a combination thereof may be included in the main processor 221. If the encryption module 22, the random number generation module 23, or a combination thereof is included in the main processor 221, the main processor 221 may use the modules 22 and 23 in the REE, the TEE, or a combination thereof.

Although FIG. 2 illustrates that the secure processor 223 is included in the electronic device 201, this is merely an example. If the secure processor 223 is not included in the electronic device 201, the main processor 221 may perform the role of the secure processor 223. In this instance, the function of the secure memory 225 may be provided via a normal memory (e.g., the memory 130). If the main processor 221 performs the role of the secure processor 223, the main processor 221 may encrypt and store the second security key 27 or the first security key 26 in a normal memory (e.g., the memory 130). In this instance, if a normal application attempts to access the second security key 27 or the first security key 26, the main processor 221 may restrict the access by the normal application. If a normal application attempts to access the first security key 26 or the second security key 27, the main processor 221 may perform control so that the application accesses the first security key 26 or the second security key 27 using a separate authentication procedure (e.g., pin number, biometric authentication, or the like).

Figure 3:
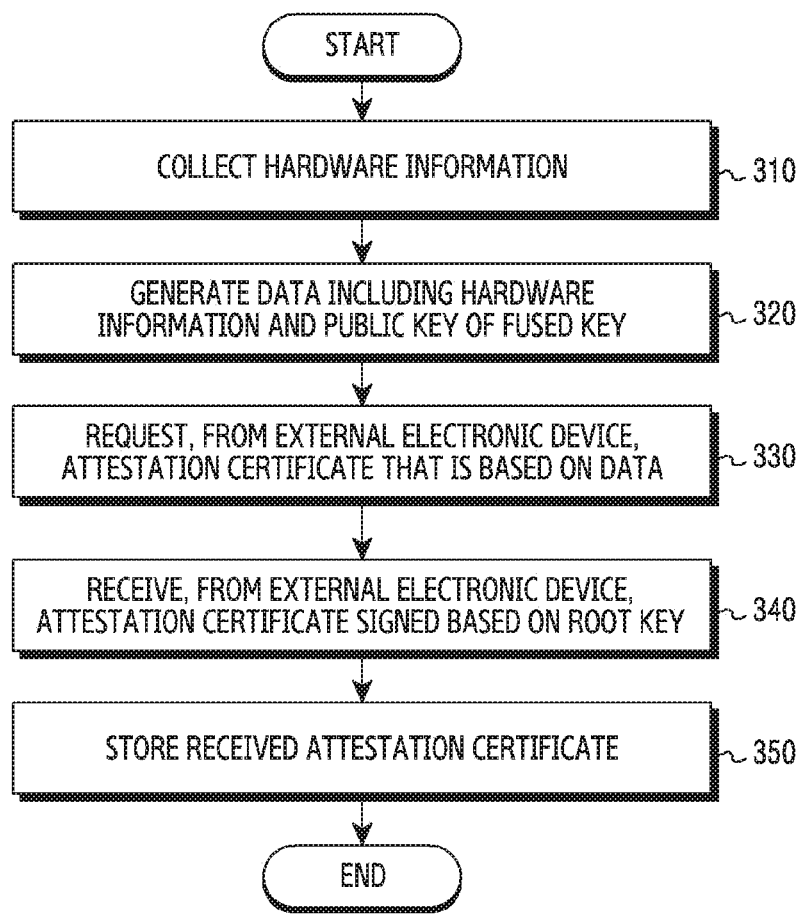
FIG. 3 is a flowchart of an operation of generating an attestation certificate in an electronic device, according to an embodiment.

FIG. 3 is a flowchart of an operation of generating an attestation certificate in an electronic device (e.g., the electronic device 201) according to an embodiment. FIG. 3 will be described with reference to FIGS. 1 and 2.

At step 310, the electronic device 201 may collect hardware information. In a TEE, the main processor (e.g., the main processor 221) of the electronic device 201 may collect hardware information. In the TEE, the main processor 221 may generate a hash value based on the collected hardware information using a hash function, and thus, the hardware information may be processed as a hash value. The main processor 221 may collect hardware information via a program (e.g., the program 140) operating in the TEE.

Hardware information may include information identified for each hardware. Hardware information may include an international mobile equipment identity (IMEI), model information, manufacturer information, a serial number, a hardware ID, baseband information, or a combination thereof. However, hardware information is not limited to the above-mentioned information, and may further include other information.

At step 320, the electronic device 201 may generate data including the hardware information and the public key of a fused key. In the TEE, the main processor 221 may generate data including the hardware information and the public key of the fused key. The main processor 221 may generate data including the hardware information and the public key of the fused key via a program (e.g., the program 140) operating in the TEE.

The fused key may correspond to the first security key 26. The fused key may be a key stored in the secure integrated circuit 200 in a manner of being fused. The fused key may be stored in the form of a key pair including a plurality of key values respectively corresponding to the secure integrated circuit 200. Each key may be generated as a public key or a private key via a key generation algorithm (e.g., elliptic curve algorithm, RSA). The fused key may be referred to as an attestation key.

In the TEE, the main processor 221 may obtain the public key of the fused key via the secure processor 223 that operates in the SEE. In the TEE, the main processor 221 may generate data including the hardware information and the public key of the fused key obtained via, the secure processor 223. The main processor 221 may use a program (e.g., the program 140) that operates in the TEE so as to request the public key of the fused key from a program (e.g., the program 140) that operates in the SEE via the secure processor 223. If the program that operates in the SEE transfers the public key of the fused key in response to the request, the main processor 221 may obtain the public key of the fused key. The fused key may be a key that is accessible by the secure processor 223 that operates in the SEE. The fused key may be a key that is accessible via an allowed program among programs (e.g., the program 140) that operate in the SEE via the processor 223. A program that runs in the SEE may be a program of which the security is strengthened, or may be a program that has a right to access data stored in the SEE. In the case of data of which the security is considered important, the data may be stored in the SEE, and if access to the data of which the security is considered important is managed by a program that runs in the SEE, the security of the data may be tightened.

In the TEE, the main processor 221 may generate data by inserting the public key of the fused key and the hardware information into a set field of an attestation certificate. The main processor 221 may generate data including the public key of the fused key and the hardware information via a program (e.g., the program 140) operating in the TEE. The data including the public key of the fused key and the hardware information may be referred to as a certificate signing request (CSR).

In the SEE, the secure processor 223 may sign the CSR using the private key of the fused key. In the SEE, the secure processor 223 may electronically sign the CSR using a private key, via an encryption module (e.g., an encryption module 22).

In the SEE, the secure processor 223 may transmit the CSR signed using the private of the fused key to the main processor 221. In the TEE, the main processor 221 may receive the signed CSR (CSR signed by the fused key in SEE). The secure processor 223 may transfer the signed CSR using a program (e.g., the program 140) operating the in the SEE to a program (e.g., the program 140) operating in the TEE that requests signing.

At step 330, the electronic device 201 may request an attestation certificate that is based on the data, from an external electronic device (e.g., the electronic device 102). The data may be data including the hardware information and the public key of the fused key. The data may be the signed CSR.

The main processor 221 may transfer the signed CSR from the TEE to the REE. In the REE, the main processor 221 may transmit the signed CSR to the external electronic device (e.g., the electronic device 102), so as to request an attestation certificate. The main processor 221 may transfer the signed CSR using a program (e.g., the program 140) operating the in the TEE to a program (e.g., the program 140) operating in the REE. The main processor 221 may transfer the signed CSR using a program (e.g., the program 140) operating the in the REE, to the external electronic device (e.g., the electronic device 102), so as to request an attestation certificate.

In the REE, the main processor 221 may transmit the signed CSR to the external electronic device (e.g., the electronic device 102) using a connection terminal (e.g., the connection terminal 178) or a communication module (e.g., the communication module 190).

The external electronic device (e.g., the electronic device 102) may be a device capable of generating an attestation certificate associated with the electronic device 201 when the electronic device 201 is manufactured. The external electronic device (e.g., the electronic device 102) may be referred to as a hardware security module (HSM) that generates an attestation certificate associated with the electronic device 201 when the electronic device 201 is manufactured.

The external electronic device (e.g., the electronic device 102) may sign the signed CSR, using the private key of a root key. The external electronic device (e.g., the electronic device 102) may sign the signed CSR, using the private key of the root key, so as to generate an attestation certificate. The external electronic device (e.g., the electronic device 102) may transmit the generated attestation certificate to the electronic device 201.

At step 340, the electronic device 201 may receive the attestation certificate generated based on the root key, from the external electronic device (e.g., the electronic device 102). In the REE, the main processor 221 may receive the attestation certificate generated using the root key from the external electronic device (e.g., the electronic device 102). The main processor 221 may receive the attestation certificate generated. using the root key via a program (e.g., the program 140) operating the in the REE, from the external electronic device (e.g., the electronic device 102).

The electronic device 201 may receive the attestation certificate from the external electronic device (e.g., the electronic device 102) using a connection terminal (e.g., the connection terminal 178) or a communication module (e.g., the communication module 190).

At step 350, the electronic device 201 may store the received attestation certificate in the electronic device 201. In the REE, the main processor 221 may store the signed attestation certificate in a memory (e.g., the memory 130). In the REE, the main processor 221 may store the signed attestation certificate in a memory (e.g., the memory 130), using a program (e.g., the program 140) operating in the REE. The main processor 221 may transfer the signed attestation certificate to a program (e.g., the program 140) operating in the SEE, via a program (e.g., the program 140) operating the in the REE. The secure processor 223 may store the attestation certificate in a secure memory (e.g., the secure memory 225), using a program (e.g., the program 140) operating in the SEE.

Figure 4:
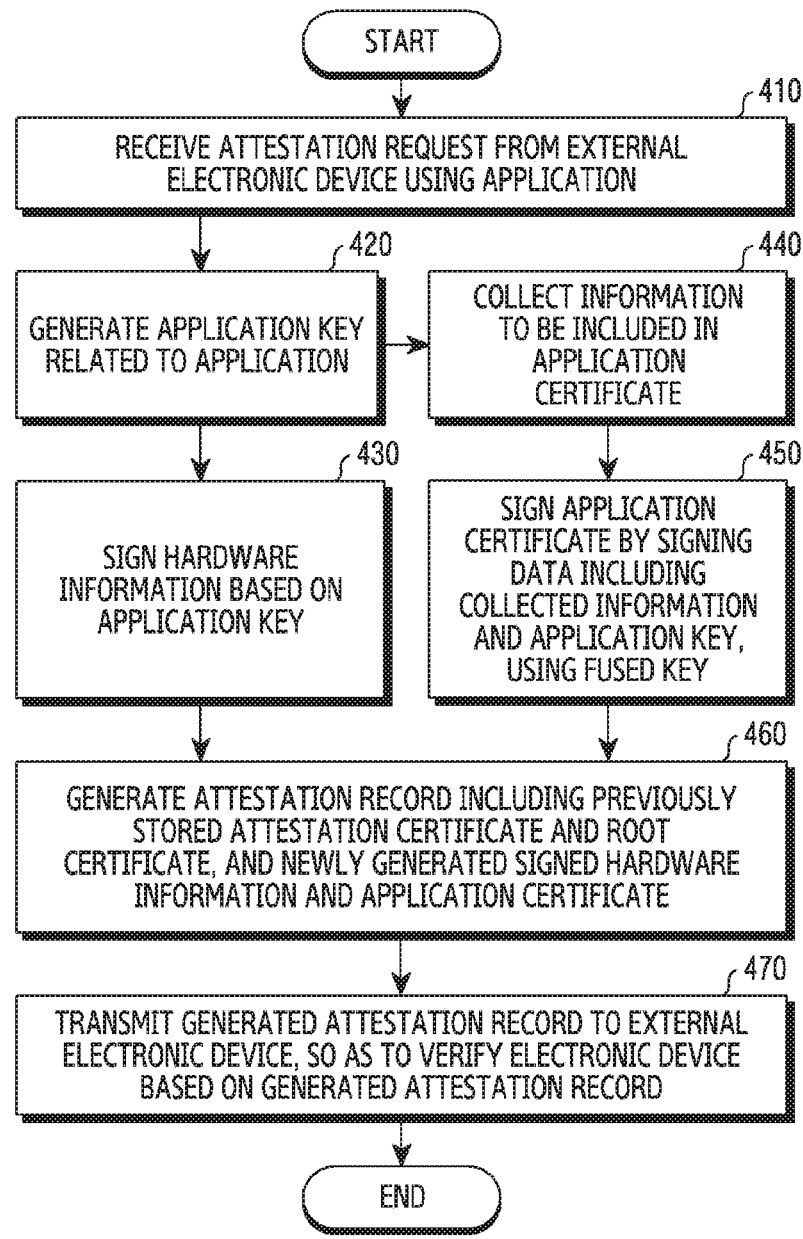
FIG. 4 is a flowchart of an operation of generating an attestation record in an electronic device, according to an embodiment.

FIG. 4 is a flowchart of an operation of generating an attestation record in an electronic device (e.g., the electronic device 201) according to an embodiment. FIG. 4 will be described with reference to FIGS. 1 and 2.

At step 410, the electronic device 201 may receive an attestation request from an external electronic device (e.g., the server 108), using an application (e.g., the application 146). The main processor (e.g., the main processor 221) of the electronic device 201 may receive the attestation request from the external electronic device (e.g., the server 108), using the application 146 operating in a normal execution environment (the REE).

The attestation request may request an attestation record of the electronic device 201. The attestation request may include a challenge of the external electronic device (e.g., the server 108). The challenge may be a value for identifying that an attestation record is generated in response to an attestation request from the external electronic device (e.g., the server 108).

At step 420, the electronic device 201 may generate an application key related to the application 146. The application key may be implemented as an application key pair of which a plurality of application keys are symmetrical to each other.

The main processor 221 may request generation of an application key from a random number generation module (e.g., the random number generation module 23) operating in the TEE, using the application 146. The main processor 221 may generate an application key using, as a seed, a random number generated via the random number generation module (e.g., the random number generation module 23) in the TEE. An algorithm for generating an application key may include various algorithms, such as a public key generation algorithm RSA, an elliptic curve algorithm, and the like.

The main processor 221 may request generation of an application key from a random number generation module (e.g., the random number generation module 23) operating in the SEE, using the application 146. The secure processor 223 may generate an application key using a random number generation module (e.g., the random number generation module 23) in the SEE.

At step 430, the electronic device 201 may sign hardware information based on the generated application key.

In the TEE, the main processor 221 may sign the hardware information, based on the application key. The main processor 221 may sign the hardware information based on the application key, via an encryption module (e.g., the encryption module 22) operating in the TEE. In the signing operation, the encryption module may generate a hash value based on the hardware information using a hash function, and may perform electronic signing using the generated application key.

In the SEE, the secure processor 223 may sign the hardware information, based on the application key. The secure processor 223 may sign the hardware information based on the application key, using a random number generation module (e.g., the random number generation module 23) in the SEE.

The electronic device 201 may collect hardware information using the application 146. The main processor 221 may collect the hardware information using the application 146.

The main processor 221 may sign the hardware information using the private key of the application key, via an encryption module (e.g., the encryption module 22) operating in the TEE. Hardware information signed using the application key may be information hashed by the main processor 221. Hardware information may include a unique identification value of hardware. The unique identification value may include information set independently for each piece of hardware (e.g., an IMEI, model information, manufacturer information, a serial number, a hardware ID, baseband information, or a combination thereof). However, hardware information is not limited to the above-mentioned information, and may include other information.

The secure processor 223 may sign the hardware information using the private key of the application key, via the encryption module 22 operating in the SEE. The hardware information signed using the application key may be information hashed by the secure processor 223. The secure processor 223 may set hardware information as an input value to a predetermined hash function, and may obtain, as hashed information, a hash value in a predetermined length, which is an output of the hash function.

At step 440, the electronic device 201 may collect information to be included in an application certificate. The information may include the state of the electronic device 201. The information may include the integrity state of software (e.g., the program 140), the warranty state of software (e.g., the program 140), the integrity state of a kernel, the integrity state of running software, and the result of comparison between hardware information included in an attestation certificate and hardware information at the point in time of attestation (e.g., at the point in time when a request for an attestation record is received), or a combination thereof. The information indicating the integrity state of software (e.g., the program 140) may be information indicating the integrity state of a software image (e.g., a bootloader, a kernel). The information indicating the warranty state may be information indicating whether software has been changed. The comparison result between hardware information included in the attestation certificate and hardware information at the point in time of attestation (e.g., at the point in time at which a request for an attestation record is received), may indicate whether the hardware information included in the attestation certificate and the hardware information at the point in time of attestation are identical to each other.

The main processor 221 may request generation of an application certificate from the secure processor 223. The secure processor 223 may collect information to be included in an application certificate, in response to a request for generation of an application certificate.

The main processor 221 may request generation of an application certificate from the secure processor 223, using the application 146. The secure processor 223 may collect information to be included in an application certificate, using a program (e.g., the program 140) operating in the SEE.

At step 450, the electronic device 201 may generate an application certificate by signing data including the collected information, a challenge, and the public key of the application key using a fused key (e.g., the first security key 26). If signing is performed, the integrity for the corresponding data may be secured. Whether the signed data is counterfeited in the middle may be determined by decoding the signed data, if signed data is counterfeited. The secure processor 223 may generate the application certificate by signing the data using the private key of the fused key. The secure processor 223 may generate the application certificate by signing the data using the private key of the fused key via the encryption module 22. The fused key may be an attestation key.

The secure processor 223 may transfer the generated application certificate to the main processor 221. The encryption module 22 of the secure processor 223 may transfer the generated application certificate to the application 146 of the main processor 221.

At step 460, the electronic device 201 may generate an attestation record including a previously stored attestation certificate and root certificate, and the newly generated signed hardware information and application certificate. The main processor 221 may generate the attestation record including the previously stored attestation certificate and root certificate and the newly generated signed hardware information and application certificate, in the REE. The main processor 221 may generate the attestation record using the application 146.

The attestation certificate may be an attestation stored via the steps described with reference to FIG. 3. The root certificate may be a certificate stored when the electronic device 201 is manufactured. The root certificate may be a certificate associated with a root key.

At step 470, the electronic device 201 may transmit the generate attestation record to the external electronic device (e.g., the server 108) so that the attestation of the electronic device is performed based on the generated attestation record.

After step 470, the external electronic device (e.g., the server 108) may identify data included in the attestation record, so as to verify the electronic device 201. The external electronic device (e.g., the server 108) may decode the received root certificate, and may identify the data included in the attestation record. The external electronic device (e.g., the server 108) may identify whether the certificate is normally signed, based on a public key associated with the certificate, so as to identify the data included in the attestation record. If it is determined that the certificate decoded using the public key is not signed by an external electronic device (e.g., an HSM), it is determined that the certificate is not normally signed.

The external electronic device (e.g., the server 108) may verify the root certificate included in the attestation record, using the root certificate stored in advance. The external electronic device (e.g., the server 108) may verify the attestation certificate included in the attestation record, if the root certificate included in the attestation record is verified (trustable).

The external electronic device (e.g., the server 108) may verify the attestation certificate included in the attestation record, using the public key of the root key included in the root certificate. The external electronic device (e.g., the server 108) may verify the application certificate included in the attestation record, if the attestation certificate included in the attestation record is verified (trustable).

The external electronic device (e.g., the server 108) may verify the application certificate included in the attestation record, using the public key of the attestation key included in the attestation certificate. If the application certificate included in the attestation record is verified (trustable), the external electronic device (e.g., the server 108) may identify the point in time at which the application certificate is generated, based on the challenge included in the application certificate.

The external electronic device (e.g., the server 108) may compare the challenge included in the application certificate and a challenge at the point in time when attestation is requested, and may identify whether the application certificate is generated in response to the attestation request.

If the application certificate included in the attestation record is verified (trustable), and the application certificate is identified as being generated in response to the attestation request, the external electronic device (e.g., the server 108) may verify the signed hardware information included in the attestation record.

The external electronic device (e.g., the server 108) may verify the signed hardware information included in the attestation record, using the public key of the application key included in the application certificate. The external electronic device (e.g., the server 108) may compare a hash value in electronic signature data decoded using the public key and a hash value obtained based on the hardware information, so as to verify the signed hardware information using the public key. The two hash values are different from each other, the external electronic device (e.g., the server 108) may determine that the hardware information gets damaged in the middle.

If the signed hardware information included in the attestation record is verified (trustable), the external electronic device (e.g., the server 108) may identify the hardware information of the electronic device 201, based on a result comparison of hardware information included in the signed hardware information, the hardware information included in the attestation certificate, and the hardware information included in the application certificate.

Figure 5:
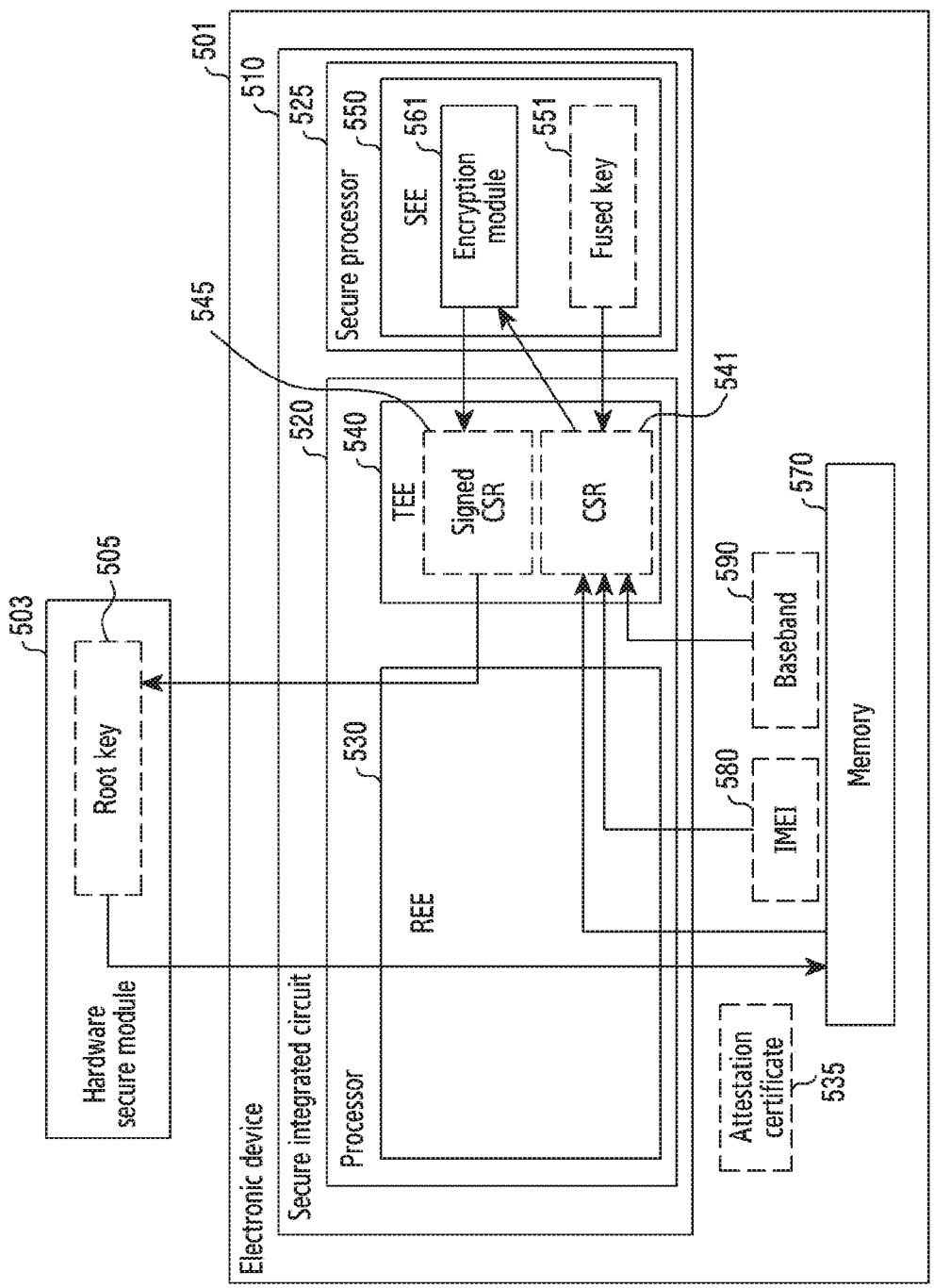
FIG. 5 is a block diagram of a method of generating an attestation certificate in an electronic device, according to an embodiment.

FIG. 5 is a block diagram of a method of generating an attestation certificate in an electronic device 501, according to an embodiment. The electronic device 501 may correspond to the electronic device 201 of FIG. 2.

The electronic device 501 may include a processor 520 and a secure processor 525 in a secure integrated circuit 510. The electronic device 501 may include a memory 570. The electronic device 501 may store hardware information (e.g., an IMEI 580 and a baseband 590) in a hardware component of the electronic device 501.

The secure integrated circuit 510 may correspond to the secure integrated circuit 200 of FIG. 2. The processor 520 may correspond to the main processor 221 of FIG. 2. The secure processor 525 may correspond to the secure processor 223 of FIG. 2. The memory 570 may correspond to the memory 130 of FIG. 1.

The processor 520 may operate in a normal execution environment REF 530, a TEE 540, or an environment corresponding to a combination thereof. The processor 520 may include a plurality of processors. If the processor 520 includes a plurality of processors, the different processors may operate in at least one environment of the REE 530 or TEE 540. The secure processor 525 may operate in an SEE 550.

The TEE 540 or the SEE 550 may have a higher security level than the REE 530 that requires a normal security level. The TEE 540 or SEE 550 may be an environment in which a program (e.g., the program 140) operates based on a resource that is different from a resource allocated to the REE 530. The TEE 540 or the SEE 550 may not allow access to a resource allocated to the TEE 540 or SEE 550 via a program that is not allowed in the TEE 540 or SEE 550. The SEE 550 may have a higher security than that of the TEE 540. The SEE 550 and TEE 540 may be determined by an application or mode running in the electronic device 501. In the case of an application of which the security is considered important, such as a financial application, a fingerprint recognition application, and the like, functions performed in the SEE 550 may be present. In the case of the SEE 550, the electronic device 501 may variably select at least one core to perform a security function, included in the secure processor 525 of the electronic device 501, and the selected core may perform a function in the SEE 550. If the function is performed in the SEE 550, data may be accessed by a secure memory (e.g., secure memory 225) separately included in the electronic device 501, or data in the secure memory (e.g., the secure memory 225) may be accessed via a separate application of which the security is strengthened. The electronic device 501 may control a right to access data by encrypting, storing, and decoding the data using a separate application that runs in the SEE 550, in order to tighten security.

In the TEE 540, the processor 520 may request the public key of an attestation key from the secure processor 525.

In the SEE 550, the secure processor 525 may provide the public key of a fused key 551 to the processor 520, in response to the request from the processor 520. In the SEE 550, the secure processor 525 may provide a public key in a key pair of the fused key 551 to the processor 520. The fused key 551 may be stored in a fused state in an area in the secure integrated circuit 510 that is accessible only in the SEE 550. The fused key 551 may be stored in a fused state in an area in the secure integrated circuit 510 that is accessible only by the secure processor 525 operating in the SEE 550. The fused key 551 may be a key pair (e.g., a private key and a public key corresponding to the private key) which is stored in a fused state in an area in the secure integrated circuit 510.

In the TEE 540, the processor 520 may receive the public key of the fused key 551 transmitted by the secure processor 525. In the TEE 540, the processor 520 may identify the public key of the fused key 551 transmitted by the secure processor 525 as the public key of the attestation key.

In the TEE 540, the processor 520 may collect hardware information (e.g., the IMEI 580 and the baseband 590) stored in the hardware component. In the TEE 540, the processor 520 may collect the hardware information (e.g., the IMEI 580 and the baseband 590) before, after, or at the same tune when the public key of the attestation key is requested.

In the TEE 540, the processor 520 may generate a CSR 541 including the collected hardware information, the public key of the attestation key, or a combination thereof. The CSR 541 may be generated by inserting the collected hardware information, the public key of the attestation key, or the combination thereof into a designated field of an attestation certificate.

In the TEE 540, the processor 520 may transfer, to the secure processor 525, a request for signing the generated CSR 541.

In the SEE 550, the secure processor 525 may sign the CSR 541 using the fused key 551 in response to the request from the processor 520. In the SEE 550, the secure processor 525 may sign the CSR 541 using the private key of the fused key 551. In the SEE 550, the secure processor 525 may sign the CSR 541 using an encryption module 561. In the SEE 550, the secure processor 525 may transfer, to the processor 520, the CSR 541 signed using the private key of the fused key 551.

In the TEE 540, the processor 520 may receive a signed CSR 545 from the secure processor 525.

In the TEE 540, the processor 520 may transfer the signed CSR 545 to the REE 530. In the REE 530, the processor 520 may transmit the signed CSR 545 to a hardware secure module 503. The hardware secure module 503 may be a device that signs the signed CSR 545 of the electronic device 501 when the electronic device 501 is manufactured, so as to generate an attestation certificate.

The hardware secure module 503 may sign the signed CSR 545 using a root key 505, so as to generate an attestation certificate 535. The hardware secure module 503 may sign the signed CSR 545 using the private key of the root key 505, so as to generate the attestation certificate 535.

The hardware secure module 503 may transmit the attestation certificate 535 to the electronic device 501.

In the REE 530, the processor 520 may receive the attestation certificate 535 from the hardware secure module 503. In the REE 530, the processor 520 may store the attestation certificate 535 in the memory 570.

The memory 570 may store the attestation certificate 535.

Although FIG. 5 illustrates that the memory 570 is implemented outside the secure integrated circuit 510, this is merely an example. The memory 570 may be implemented in the secure integrated circuit 510 together with the processor 520.

In addition, although FIG. 5 illustrates that the processor 520 accesses the memory 570 in the REE 530, this is merely an example. In the TEE 540, the processor 520 may access the memory 570 via a kernel operating in the TEE 540, so as to obtain data stored in the memory 570 or store data in the memory 570. In the SEE, 550, the secure processor 525 may access the memory 570 via a kernel operating in the SEE 550, so as to obtain data stored in the memory 570 or store data in the memory 570.

Further, although FIG. 5 illustrates that the processor 520 performs data transmission or reception with the hardware secure module 503 in the REE 530, this is merely an example. In the TEE 540, the processor 520 may control a hardware component (e.g., the communication module 190) via a kernel operating in the TEE 540, so as to perform data transmission or reception with the hardware secure module 503. In the SEE 550, the secure processor 525 may control a hardware component (e.g., the communication module 190) via a kernel operating in the SEE 550, so as to perform data transmission or reception with the hardware secure module 503.

Figure 6:
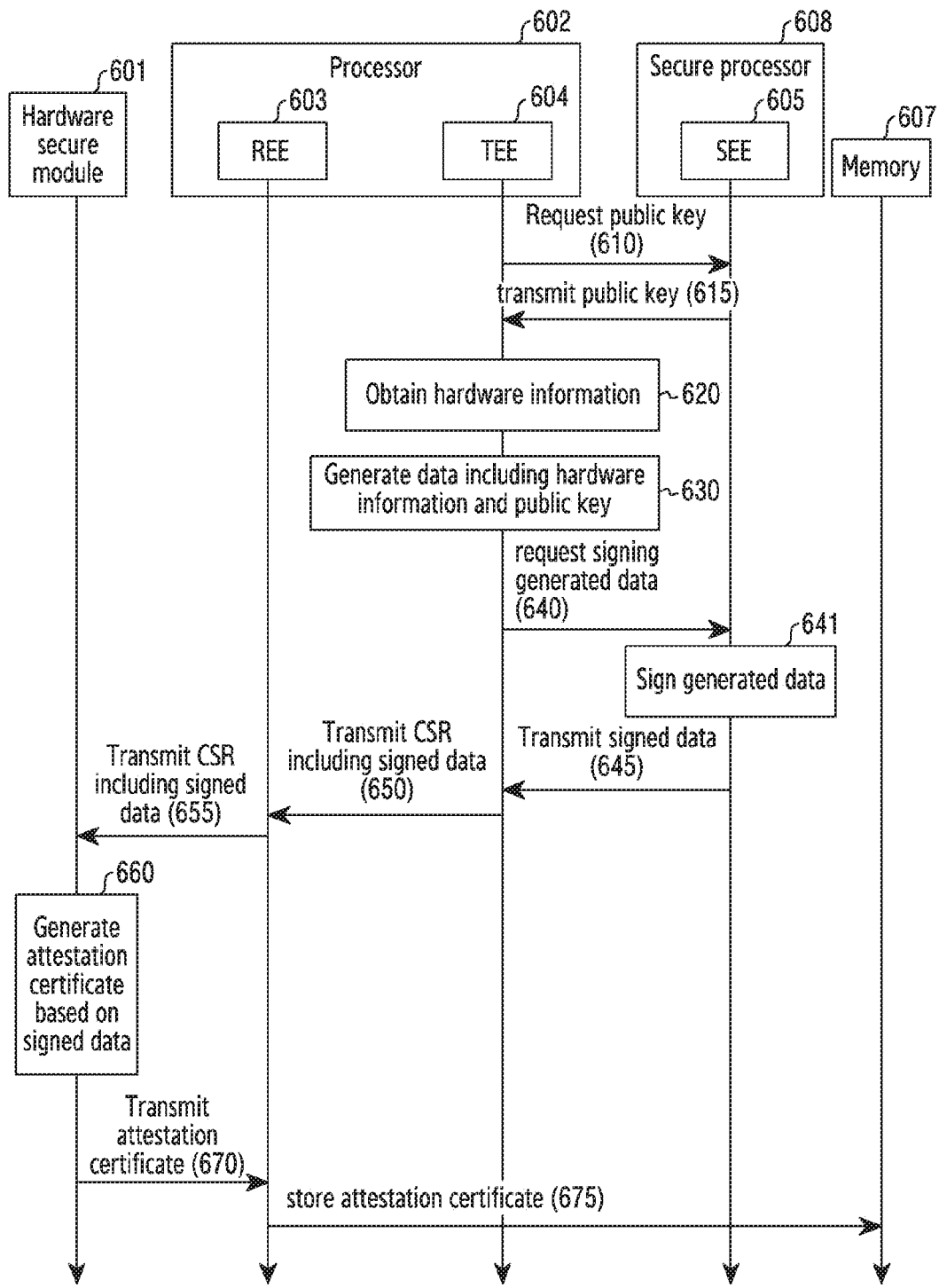
FIG. 6 is a flowchart of an operation of generating an attestation certificate in an electronic device, according to an embodiment.

FIG. 6 is a flowchart of an operation of generating an attestation certificate in an electronic device (e.g., the electronic device 501) according to an embodiment. FIG. 6 will be described with reference to FIGS. 1, 2, and 5.

At step 610, in a TEE 604, a processor 602 of an electronic device (e.g., the electronic device 501) may request a public key from a secure processor 608. In the TEE 604, the processor 602 may request the public key of an attestation key from the secure processor 608.

At step 615, in an SEE 605, the secure processor 608 may transmit the public key to the processor 602. In the SEE 605, the secure processor 608 may obtain the public key of a fused key (e.g., the fused key 551) which is accessible in the SEE 605 and may transmit the obtained public key of the fused key 551 to the processor 602 in response to the request for the public key.

In the TEE 604, the processor 602 may receive the public key transmitted from the secure processor 608.

At step 620, in the TEE 604, the processor 602 may collect hardware information (e.g., the IMEI 580 and the baseband 590) stored in a hardware component.

At step 630, in the TEE 604, the processor 602 may generate data including the hardware information and the public key, in the TEE 604, the processor 602 may generate the data by inserting the hardware information and the public key into a field set in an attestation certificate. The data including the hardware information and the public key may be a CSR.

At step 640, in the TEE 604, the processor 602 may request signing the CSR from the secure processor 608.

At step 641, in the SEE 605, the secure processor 608 may sign the CSR using a private key. In the SEE 605, the secure processor 608 may sign the CSR using the private key of the fused key 551. In the SEE 605, the secure processor 608 obtain the private key of the fused key 551, and may sign the CSR using the obtained private key of the fused key 551.

At step 645, in the SEE 605, the secure processor 608 may transfer the signed CSR to the processor 602.

At step 650, in the TEE 604, the processor 602 may transfer the signed CSR to the REE 603.

At step 655, in the REE 603, the processor 602 may transmit the signed CSR to a hardware secure module 601.

At step 660, the hardware secure module 601 may generate an attestation certificate, based on the signed CSR. The hardware secure module 601 may sign the signed CSR using the private key of a root key, so as to generate an attestation certificate.

At step 670, the hardware secure module 601 may transmit the generated attestation certificate to the processor 602. In REF 603, the processor 602 may receive the attestation certificate from the hardware secure module 601.

At step 675, in the REE 603, the processor 602 may store the attestation certificate in the memory 570.

Figure 7:
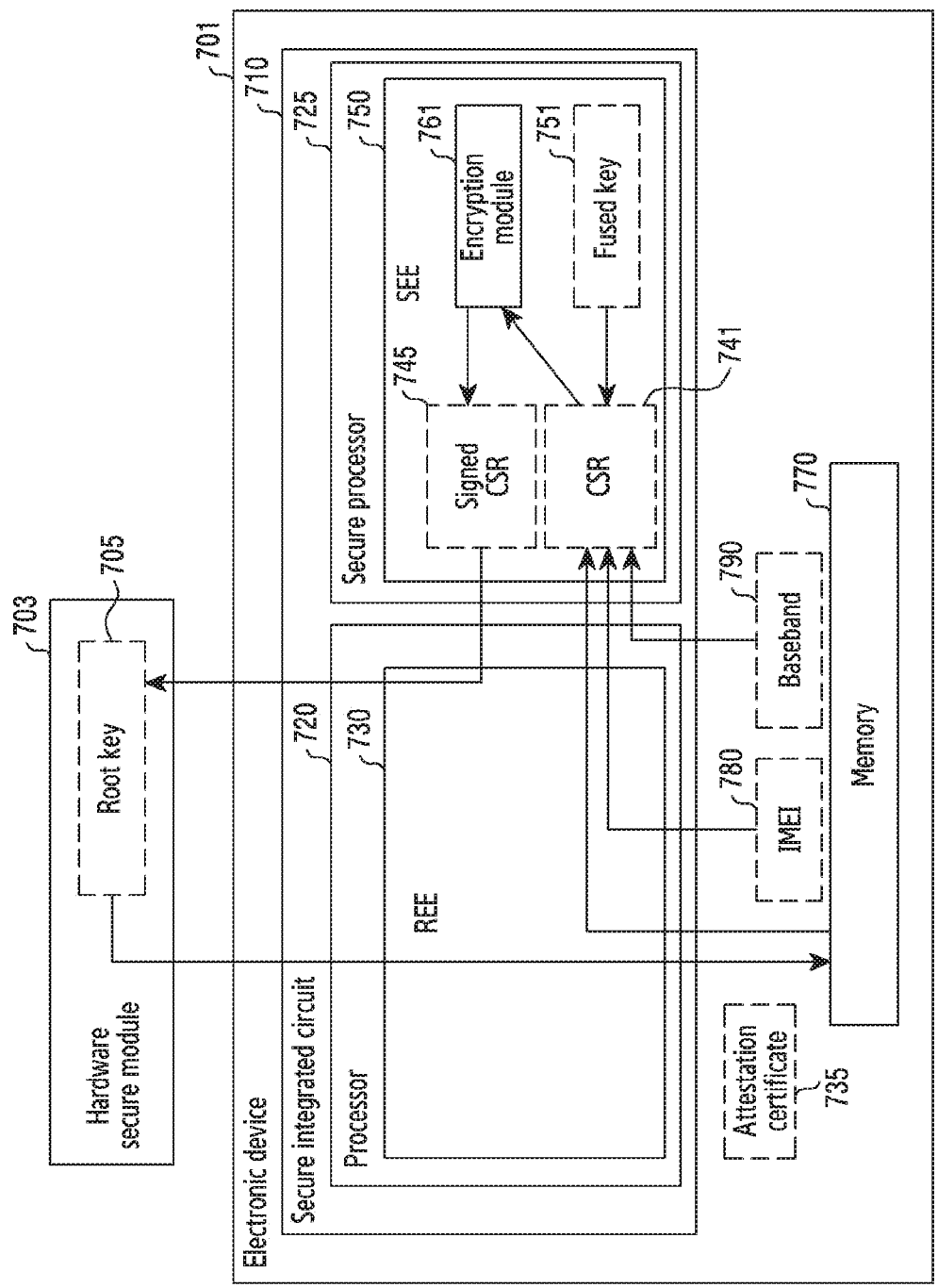
FIG. 7 is a block diagram of a method of generating an attestation certificate in an electronic device, according to an embodiment.

FIG. 7 is a block diagram of a method of generating an attestation certificate in an electronic device 701, according to an embodiment.

The electronic device 701 may correspond to the electronic device 201 of FIG. 2. Compared to the electronic device 501 of FIG. 5, the electronic device 701 of FIG. 7 may provide a function, which is provided in the TEE 540 of the processor 520 of the electronic device 501, in the SEE 750 of a secure processor 725.

The electronic device 701 may include a processor 720 and the secure processor 725 in a secure integrated circuit 710. The electronic device 701 may include a memory. 770. The electronic device 701 may store hardware information (e.g., an IMEI 780 and a baseband 790) in a hardware component of the electronic device 701.

The secure integrated circuit 710 may correspond to the secure integrated circuit 200 of FIG. 2. The processor 720 may correspond to the main processor 221 of FIG. 2. The secure processor 725 may correspond to the secure processor 223 of FIG. 2. The memory 770 may correspond to the memory 130 of FIG. 1.

The processor 720 may operate in a normal execution environment (an REE) 730. The secure processor 725 may operate in the SEE 750.

The secure processor 725 may provide the public key of a fused key 751 to the processor 720, in response to a request from the processor 720. In the SEE 750, the secure processor 725 may provide a public key in a key pair of the fused key 751 to the processor 720. The fused key 751 may be stored in a fused state in an area in the secure integrated circuit 710 that is accessible only in the SEE 750. The fused key 751 may be stored in a fused state in an area in the secure integrated circuit 710 that is accessible only by the secure processor 725 operating in the SEE 750. The fused key 751 may be implemented as a key pair, and may be stored in a fused state in an area in the secure integrated circuit 710.

The secure processor 725 may collect hardware information (e.g., the IMEI 780 and the baseband 790) stored in a hardware component.

The secure processor 725 may obtain the public key in the key pair of the fused key 751. The fused key 751 may be stored in a fused state in an area in the secure integrated circuit 710 that is accessible only in the SEE 750.

The secure processor 725 may generate a CSR 741 including the collected hardware information, the public key of an attestation key, or a combination thereof. The CSR 741 may be generated by inserting the collected hardware information, the public key of the attestation key, or the combination thereof into a designated field of an attestation certificate.

The secure processor 725 may sign the CSR 741 using the fused key 751. The secure processor 725 may sign the CSR 741 using the private key of the fused key 751. The secure processor 725 may sign the CSR 741 using an encryption module 761.

The secure processor 725 may transfer a signed CSR 745 to the processor 720 operating in the REE 730. In the REE 730, the processor 720 may transmit the signed CSR 745 to a hardware secure module 703. The hardware secure module 703 may be a device that signs the signed certificate signing request 745 of the electronic device 701 when the electronic device 701 is manufactured, so as to generate an attestation certificate.

The hardware secure module 703 may sign the signed CSR 745 using a root key 705, so as to generate an attestation certificate 735. The hardware secure module 703 may sign the signed CSR 745 using the private key of the root key 705, so as to generate the attestation certificate 735.

The hardware secure module 703 may transmit the attestation certificate 735 to the electronic device 701.

In the REE 730, the processor 720 may receive the attestation certificate 735 from the hardware secure module 703. In the REE 730, the processor 720 may store the attestation certificate 735 in the memory 770.

The memory 770 may store the attestation certificate 735.

Although FIG. 7 illustrates that the memory 770 is implemented outside the secure integrated circuit 710, this is merely an example. The memory 770 may be implemented in the secure integrated circuit 710 together with the processor 720.

Although FIG. 7 illustrates that the processor 720 accesses the memory 770 in the REE 730, this is merely an example. In the SEE 750, the secure processor 725 may access the memory 770 via a kernel operating in the SEE 750, so as to obtain data stored in the memory 770 or store data in the memory 770.

Although FIG. 7 illustrates that the processor 720 performs data transmission or reception with the hardware secure module 703 in the REE 730, this is merely an example. In the SEE 750, the secure processor 725 may control a hardware component (e.g., the communication module 190) via a kernel operating in the SEE 750, so as to perform data transmission or reception with the hardware secure module 703.

Figure 8:
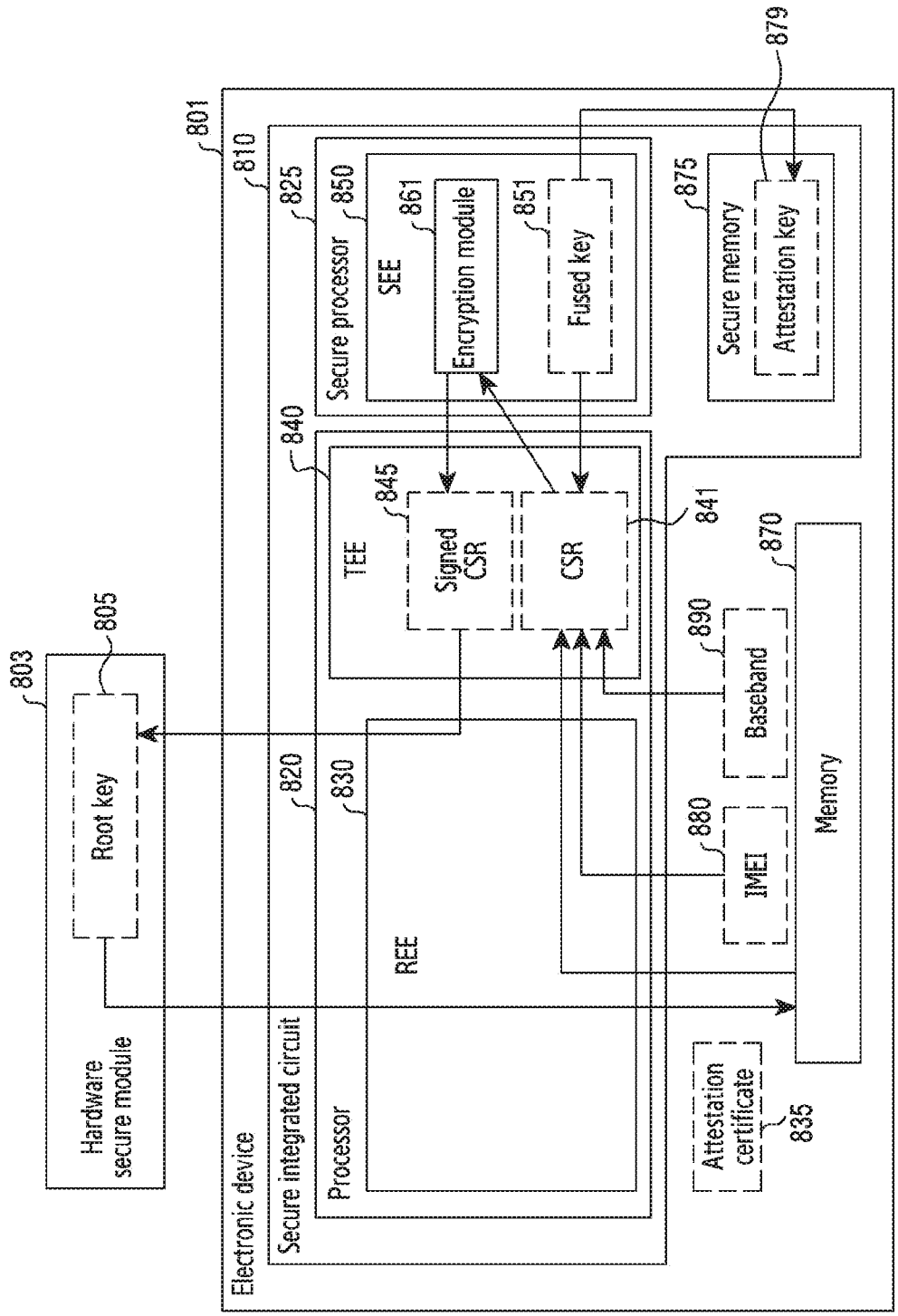
FIG. 8 is a block diagram of a method of generating an attestation certificate in an electronic device, according to an embodiment.

FIG. 8 is a block diagram of a method of generating an attestation certificate in an electronic device 801, according to an embodiment.

The electronic device 801 may correspond to the electronic device 201 of FIG. 2. Compared to the electronic device 501 of FIG. 5, the electronic device 801 of FIG. 8 may further include a secure memory 875, Compared to the electronic device 501 of FIG. 5, the electronic device 801 of FIG. 8 may further include a random number generation module 855 operating in the SEE 850. The random number generation module 855 may correspond to the random number generation module 23 of FIG. 2.

The electronic device 801 may include a processor 820 and a secure processor 825 in a secure integrated circuit 810. The electronic device 801 may include a memory 870. The electronic device 801 may store hardware information (e.g., an IMEI 850 and a baseband 890) in a hardware component of the electronic device 801.

The secure integrated circuit 810 may correspond to the secure integrated circuit 200 of FIG. 2. The processor 820 may correspond to the main processor 221 of FIG. 2. The secure processor 825 may correspond to the secure processor 223 of FIG. 2. The memory 870 may correspond to the memory 130 of FIG. 1.

The processor 820 may operate in a normal execution environment (an REE) 830, a TEE 840, or an environment corresponding to a combination thereof. The secure processor 825 may operate in the SEE 850.

In the TEE 840, the processor 820 may request generation of an attestation key from the secure processor 825.

In the SEE 850, the secure processor 825 may generate an attestation key 851 in response to the request from the processor 820. The secure processor 825 may generate the attestation key 851 using the random number generation module 855. The secure processor 825 may generate a pair of attestation keys 851.

In the SEE 850, the secure processor 825 may store the generated attestation key 851 in the secure memory 875. The secure memory 875 may be a memory accessible in the SEE 850. The secure memory 875 may be a memory accessible by the secure processor 825.

In the TEE 840, the processor 820 may request the public key of the attestation key from the secure processor 825.

The secure processor 825 may provide the public key of the attestation key 851 to the processor 820, in response to the request from the processor 820. The secure processor 825 may obtain the public key of the attestation key 851 which is stored in the secure memory 875, and may provide the obtained public key of the attestation key 851 to the processor 820, in response to the request from the processor 820.

In the TEE 840, the processor 820 may receive the public key of the attestation key 851 transmitted from the secure processor 825.

In the TEE 840, the processor 820 may collect hardware information (e.g., the IMEI 850 and the baseband 890) stored in a hardware component. In the TEE 840, the processor 820 may collect hardware information (e.g., the IMEI 850 and baseband 890) before, after, or at the same time when the public key of the attestation key is requested.

In the TEE 840, the processor 820 may generate a CSR 841 including the collected hardware information, the public key of the attestation key, or a combination thereof. The CSR 841 may be generated by inserting the collected hardware information, the public key of the attestation key, or the combination thereof into a designated field of an attestation certificate.

In the TEE 840, the processor 820 may transfer, to the secure processor 825, a request for signing the generated CSR 841.

In the SEE 850, the secure processor 825 may sign the CSR 841 using the attestation key 851 in response to the request from the processor 820. In the SEE 850, the secure processor 825 may obtain the private key of the attestation key 851 which is stored in the secure memory 875, and may sign the CSR 841 using the obtained private key of the attestation key 851. In the SEE 850, the secure processor 825 may sign the CSR 841 using an encryption module 861. In the SEE 850, the secure processor 825 may transfer, to the processor 820, the CSR 841 signed using the private key of the attestation key 851.

In the TEE 840, the processor 820 may receive a signed CSR 845 from the secure processor 825.

In the TEE 840, the processor 820 may transfer the signed CSR 845 to the REE 830. In the REE 830, the processor 820 may transmit the signed CSR 845 to a hardware secure module 803. The hardware secure module 803 may sign the signed CSR 845 of the electronic device 801 when the electronic device 801 is manufactured, so as to generate an attestation certificate.

The hardware secure module 803 may sign the signed CSR 845 using a root key 808, so as to generate an attestation certificate 835. The hardware secure module 803 may sign the signed CSR 845 using the private key of the root key 808, so as to generate the attestation certificate 835.

The hardware secure module 803 may transmit the attestation certificate 835 to the electronic device 801.

In REE 830, the processor 820 may receive the attestation certificate 835 from the hardware secure module 803. In the REE 830, the processor 820 may store the attestation certificate 835 in the memory 870.

The memory 870 may store the attestation certificate 835.

Although FIG. 8 illustrates that the memory 870 is implemented outside the secure integrated circuit 810, this is merely an example. The memory 870 may be implemented in the secure integrated circuit 810 together with the processor 820.

Although FIG. 8 illustrates that the processor 820 accesses the memory 870 in the REE 830, this is merely an example. In the TEE 840, the processor 820 may access the memory 870 via a kernel operating in the TEE 840, so as to obtain data stored in the memory 870 or store data in the memory 870. In the SEE 850, the secure processor 825 may access the memory 870 via a kernel operating in the SEE 850, so as to obtain data stored in the memory 870 or store data in the memory 870.

Although FIG. 8 illustrates that the processor 820 performs data transmission or reception with the hardware secure module 803 in the REE 830, this is merely an example. In the TEE 840, the processor 820 may control a hardware component (e.g., the communication module 190) via a kernel operating in the TEE 840, so as to perform data transmission or reception with the hardware secure module 803. In the SEE 850, the secure processor 825 may control a hardware component (e.g., the communication module 190) via a kernel operating in the SEE 850, so as to perform data transmission or reception with the hardware secure module 803.

Figure 9:
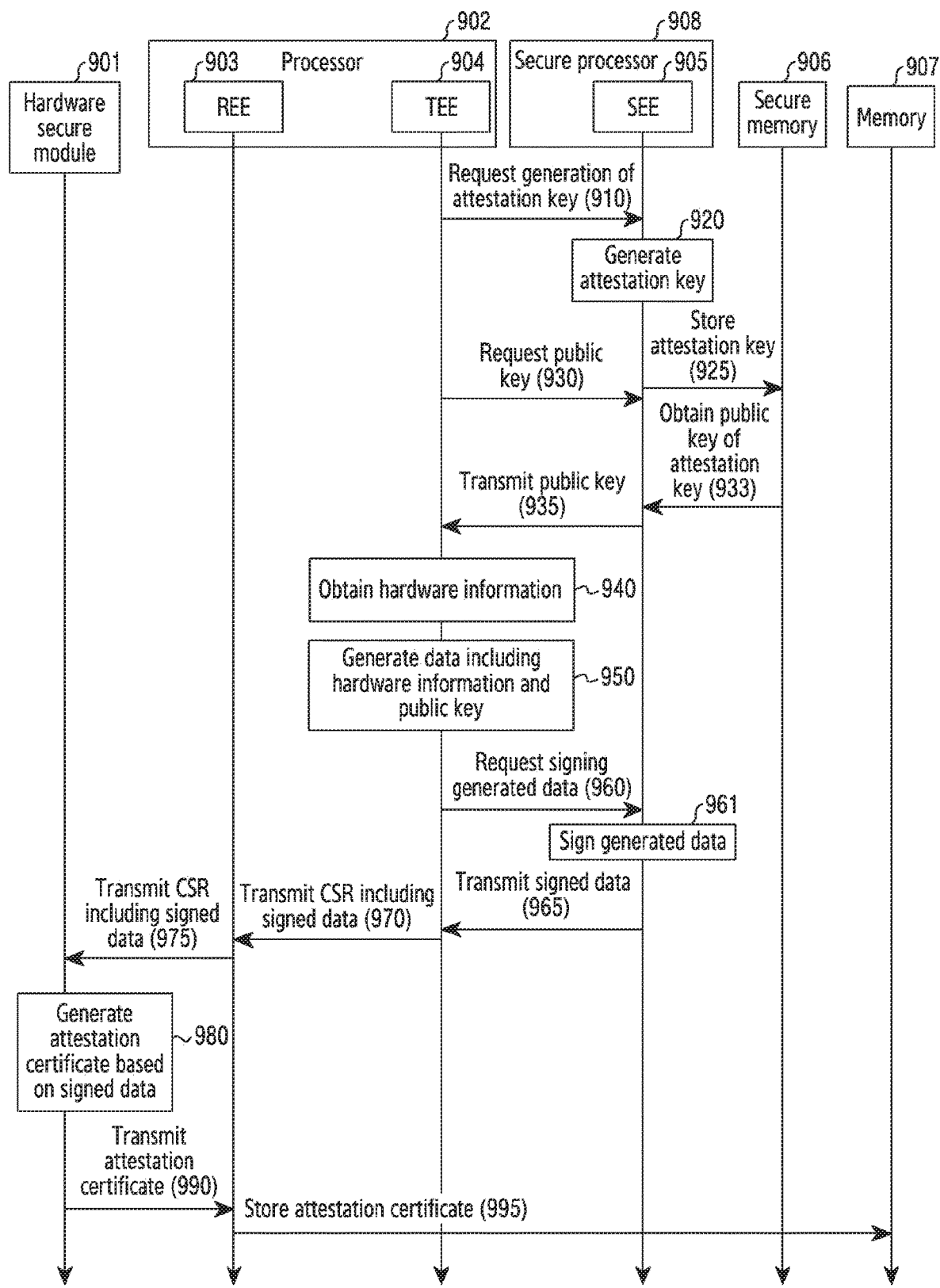
FIG. 9 is a flowchart of an operation of generating an attestation certificate in an electronic device, according to an embodiment.

FIG. 9 is a flowchart of an operation of generating an attestation certificate in an electronic device (e.g., the electronic device 801) according to an embodiment. FIG. 9 will be described with reference to FIGS. 1, 2, and 8.

At step 910, in a TEE 904, a processor 902 of an electronic device (e.g., the electronic device 501) may request generation of an attestation key (e.g., the attestation key 851) from a secure processor 908.

At step 920, in an SEE 905, the secure processor 908 may generate the attestation key 851 in response to the request from the processor 902. The secure processor 908 may generate the attestation key 851 using a random number generation module (e.g., the random number generation module 855). The secure processor 908 may generate a pair of attestation keys 851.

At step 925, the secure processor 908 may store the generated attestation key 851 in a secure memory 906. The secure memory 906 may be a memory accessible in the SEE 905. The secure memory 906 may be a memory accessible by the secure processor 905.

At step 930, in the TEE 904, the processor 902 may request a public key from the secure processor 908. In the TEE 904, the processor 902 may request the public key of the attestation key from the secure processor 908.

At step 933, the secure processor 908 may obtain the public key of the attestation key 851 from the secure memory 906, in response to the request from the processor 902.

At step 935, the secure processor 908 may provide the public key of the attestation key 851 obtained from the secure memory 906 to the processor 902. In the TEE 904, the processor 902 may receive the public key transmitted from the secure processor 908.

At step 940, in the TEE 904, the processor 902 may collect hardware information (e.g., the IMEI 580 and the baseband 590) stored in a hardware component.

At step 950, in the TEE 904, the processor 902 may generate data including the hardware information and the public key. In the TEE 904, the processor 902 may generate data by inserting the hardware information and the public key into a field set in an attestation certificate. The data including the hardware information and the public key may be a CSR.

At step 960, in the TEE 904, the processor 902 may request signing a CSR from the secure processor 908.

At step 961, in the SEE 905, the secure processor 908 may sign the CSR using a private key. In the SEE 905, the secure processor 908 may sign the CSR using the private key of the attestation key 851. In the SEE 905, the secure processor 908 may obtain the private key of the attestation key 851, and may sign the CSR using the obtained private key of the attestation key 851.

At step 965, in the SEE 905, the secure processor 908 may transfer the signed CSR to the processor 902.

At step 970, in the TEE 904, the processor 902 may transfer the signed CSR to a normal execution environment (an REE) 903.

At step 975, in the REE 903, the processor 902 may transmit the signed CSR to a hardware secure module 901.

At step 980, the hardware secure module 901 may generate an attestation certificate, based on the signed CSR. The hardware secure module 901 may sign the signed CSR using the private key of a root key, so as to generate an attestation certificate.

At step 990, the hardware secure module 901 may transmit the generated attestation certificate to the processor 902. In the REE 903, the processor 902 may receive the attestation certificate from the hardware secure module 901.

At step 995, in the REE 903, the processor 902 may store the attestation certificate in a memory 907.

Figure 10:
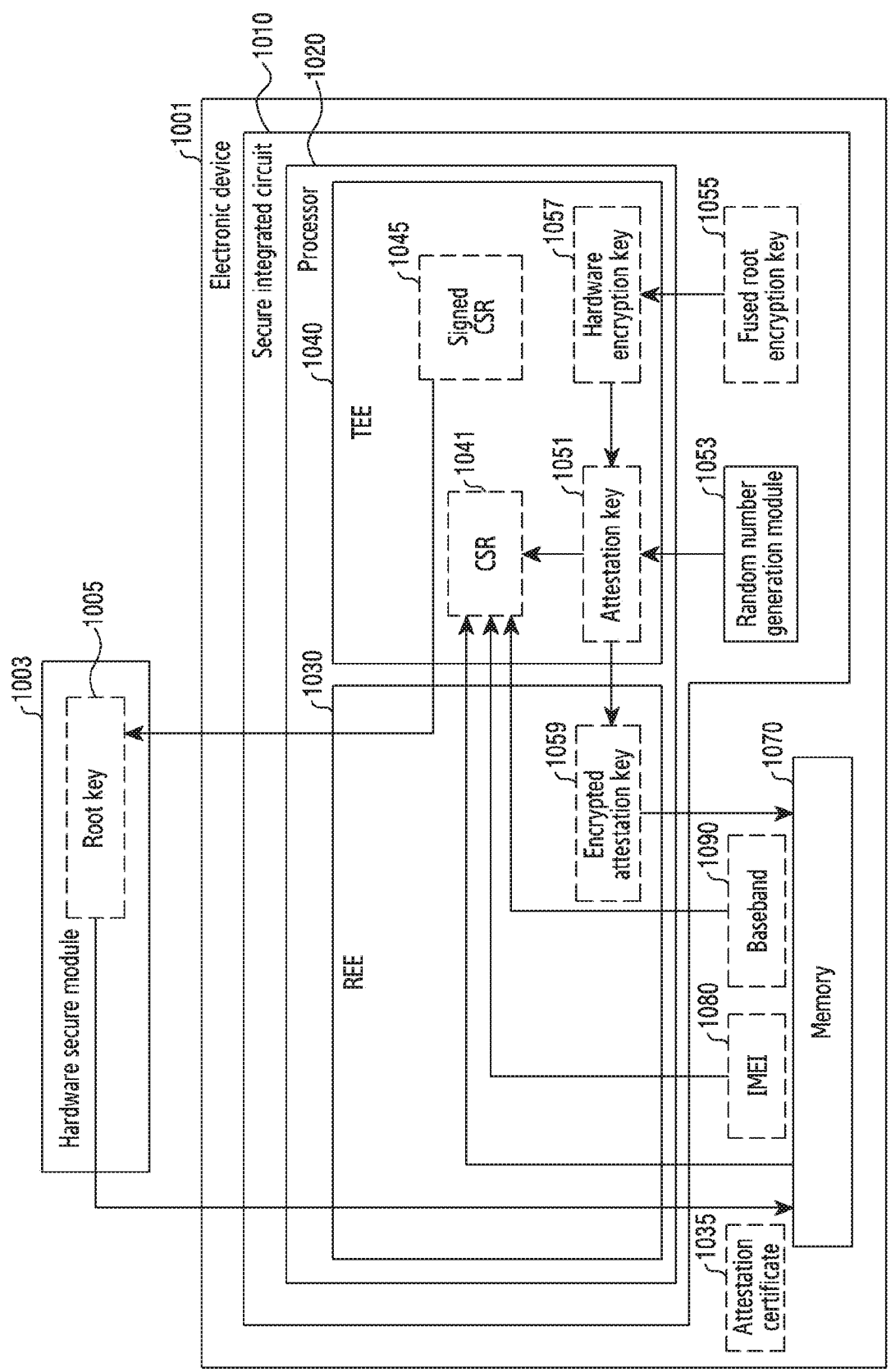
FIG. 10 is a block diagram of a method of generating an attestation certificate in. an electronic device, according to an embodiment.

FIG. 10 is a block diagram of a method of generating an attestation certificate in an electronic device, according to an embodiment.

An electronic device 1001 may correspond to the electronic device 201 of FIG. 2. Compared to the electronic device 501 of FIG. 5, the electronic device 1001 of FIG. 10 may provide a function, which is provided in the SEE 550 of the electronic device 501 of FIG. 5, in a TEE 1040.

The electronic device 1001 may include a processor 1020 in a secure integrated circuit 1010. The electronic device 1001 may include a memory 1070. The electronic device 1001 may store hardware information (e.g., an IMEI 1080 and a baseband 1090) in a hardware component of the electronic device 1001.

The secure integrated circuit 1010 may correspond to the secure integrated circuit 200 of FIG. 2. The processor 1020 may correspond to the main processor 221 of FIG. 2. The secure processor 1025 may correspond to the secure processor 223 of FIG. 2. The memory 1070 may correspond to the memory 130 of FIG. 1.

The processor 1020 may operate in a normal execution environment (an REE) 1030, the TEE 1040, or an environment corresponding to a combination thereof.

In the TEE 1040, the processor 1020 may generate an attestation key 1051. In the TEE 1040, the processor 1020 may generate the attestation key 1051 using a random number generation module 1053. The random number generation module 1053 may be implemented via a circuit printed on the secure integrated circuit 1010. However, this is merely an example, and the random number generation module 1053 may be implemented by a program operating in the TEE 1040.

In the TEE 1040, the processor 1020 may collect hardware information (e.g., the IMEI 1080 and the baseband 1090) stored in a hardware component.

In the TEE 1040, the processor 1020 may generate a CSR 1041 including the collected hardware information, the public key of the attestation key 1051, or a combination thereof. The CSR 1041 may be generated by inserting the collected hardware information, the public key of the attestation key 1051, or the combination thereof into a set field of an attestation certificate.

In the TEE 1040, the processor 1020 may sign the CSR 1041 using the attestation key 1051. The processor 1020 may sign the CSR 1041 using the private key of the attestation key 1051. The secure processor 1020 may sign the CSR 1041 using an encryption module (e.g., the encryption module 22). The encryption module (e.g., the encryption module 22) may be implemented via a circuit printed on the secure integrated. circuit 1010. The encryption module (e.g., encryption module 22) printed on the secure integrated circuit 1010 may be usable in the TEE 1040. The encryption module (e.g., the encryption module 22) may be implemented via a program operating in the TEE 1040.

The processor 1020 may transfer the signed CSR 1045 to the REE 1030. In the REF 1030, the processor 1020 may transmit the signed CSR 1045 to a hardware secure module 1003. The hardware secure module 1003 may sign the signed CSR 1045 of the electronic device 1001 when the electronic device 1001 is manufactured, so as to generate an attestation certificate.

The hardware secure module 1003 may sign the signed CSR 1045 using a root key 1005, so as to generate an attestation certificate 1035. The hardware secure module 1003 may sign the signed CSR 1045 using the private key of the root key 1005, so as to generate the attestation certificate 1035.

The hardware secure module 1003 may transmit the attestation certificate 1035 to the electronic device 1001.

In REE 1030, the processor 1020 may receive the attestation certificate 1035 from the hardware secure module 1003. In the REE 1030, the processor 1020 may store the attestation certificate 1035 in the memory 1070.

The memory 1070 may store the attestation certificate 1035.

In the TEE 1040, the processor 1020 may encrypt the attestation key 1051.

In the TEE 1040, the processor 1020 may generate a hardware encryption key (HEK) 1057 using a fused root encryption key (REK) 1055. In the TEE 1040, the processor 1020 may encrypt the attestation key 1051 using the generated hardware encryption key. The root encryption key 1055 may be a key stored by being combined with the secure integrated circuit 1010. The root encryption key 1055 may be a key accessibly in the TEE 1040.

In the TEE 1040, the processor 1020 may transfer an encrypted attestation key 1059 to the REE 1030. In the REE 1030, the processor 1020 may store the encrypted attestation key 1059 in the memory 1070.

Although FIG. 10 illustrates that the memory 1070 is implemented outside the secure integrated circuit 1010, this is merely an example. The memory 1070 may be implemented in the secure integrated circuit 1010 together with the processor 1020.

Although FIG. 10 illustrates that the processor 1020 accesses the memory 1070 in the REE 1030, this is merely an example. In the TEE 1040, the processor 1020 may access the memory 1070 via a kernel operating in the TEE 1040, so as to obtain data stored in the memory 1070 or store data in the memory 1070.

Although FIG. 10 illustrates that the processor 1020 performs data transmission or reception with the hardware secure module 1003 in the REE 1030, this is merely an example. In the TEE 1040, the processor 1020 may control a hardware component (e.g., the communication module 190) via a kernel operating in the TEE 1040, so as to perform data transmission or reception with the hardware secure module 1003.

Figure 11:
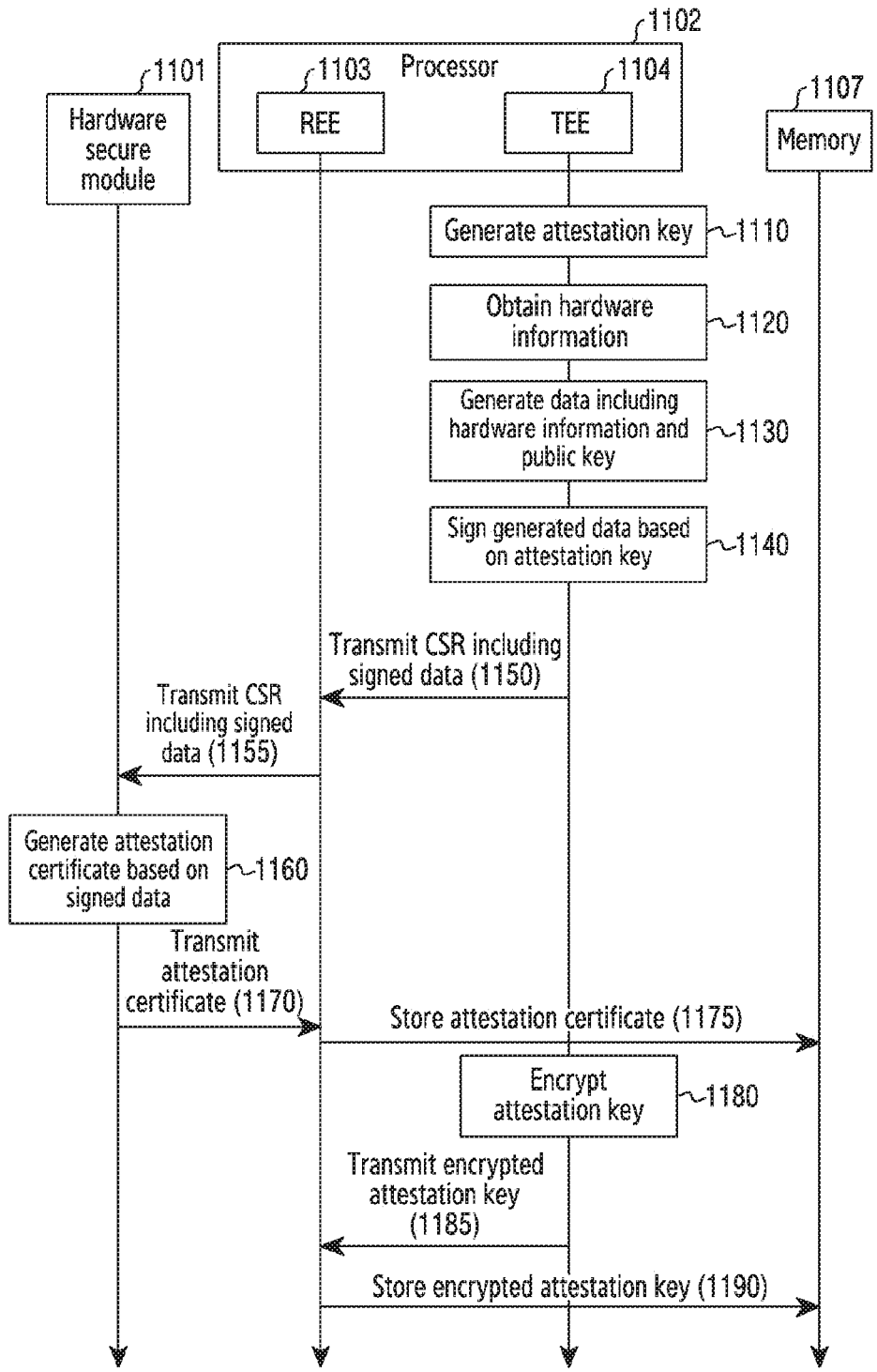
FIG. 11 is a flowchart of an operation of generating an attestation certificate in an electronic device, according to an embodiment.

FIG. 11 is a flowchart of an operation of generating an attestation certificate in an electronic device, according to an embodiment. FIG. 11 will be described with reference to FIGS. 1, 2, and 10.

At step 1110, in a TEE 1104, a processor 1102 of an electronic device (e.g., the electronic device 1001) may generate the attestation key 1051. The processor 1102 may generate the attestation key 1051 using a random number generation module (e.g., the random number generation module 1053). The processor 1102 may generate a pair of attestation keys 1051.

At step 1120, in the TEE 1104, the processor 1102 may collect hardware information (e.g., the IMEI 580 and the baseband 590) stored in a hardware component.

At step 1130, in the TEE 1104, the processor 1102 may generate data including the hardware information and a public key. In the TEE 1104, the processor 1102 may generate data by inserting the hardware information and the public key into a field set in an attestation certificate. The data including the hardware information and the public key may be a CSR.

At step 1140, in the TEE 1104, the processor 1102 may sign a CSR. The processor 1102 may sign the CSR using the private key of the attestation key 1051.

At step 1150, in the TEE 1104, the processor 1102 may transfer the signed CSR to the REE 1103.

At step 1155, in a normal execution environment (an REE) 1103, the processor 1102 may transmit the signed CSR to a hardware secure module 1101.

At step 1160, the hardware secure module 1101 may generate an attestation certificate, based on the signed CSR. The hardware secure module 1101 may sign the signed CSR using the private key of a root key; so as to generate an attestation certificate.

At step 1170, the hardware secure module 1101 may transmit the generated attestation certificate to the processor 1102. In the REE 1103, the processor 1102 may receive the attestation certificate from the hardware secure module 1101.

At step 1175, in the REE 1103, the processor 1102 may store the attestation certificate in the memory 1107.

At step 1180, in the TEE 1104, the processor 1102 may encrypt the attestation key 1051. In the TEE 1104, the processor 1102 may encrypt the attestation key 1051, based on a fused key (e.g., the fused root encryption key 1055). In the TEE 1104, the processor 1102 may encrypt the attestation key 1051, using a key (e.g., the hardware key 1057) generated based on the fused key.

At step 1185, the TEE 1104, the processor 1102 may transfer the encrypted attestation key (e.g., the encrypted attestation key 1059) to the REF 1030.

At step 1190, in the REE 1103, the processor 1102 may store the encrypted attestation key 1059 in the memory 1107.

Figure 12:
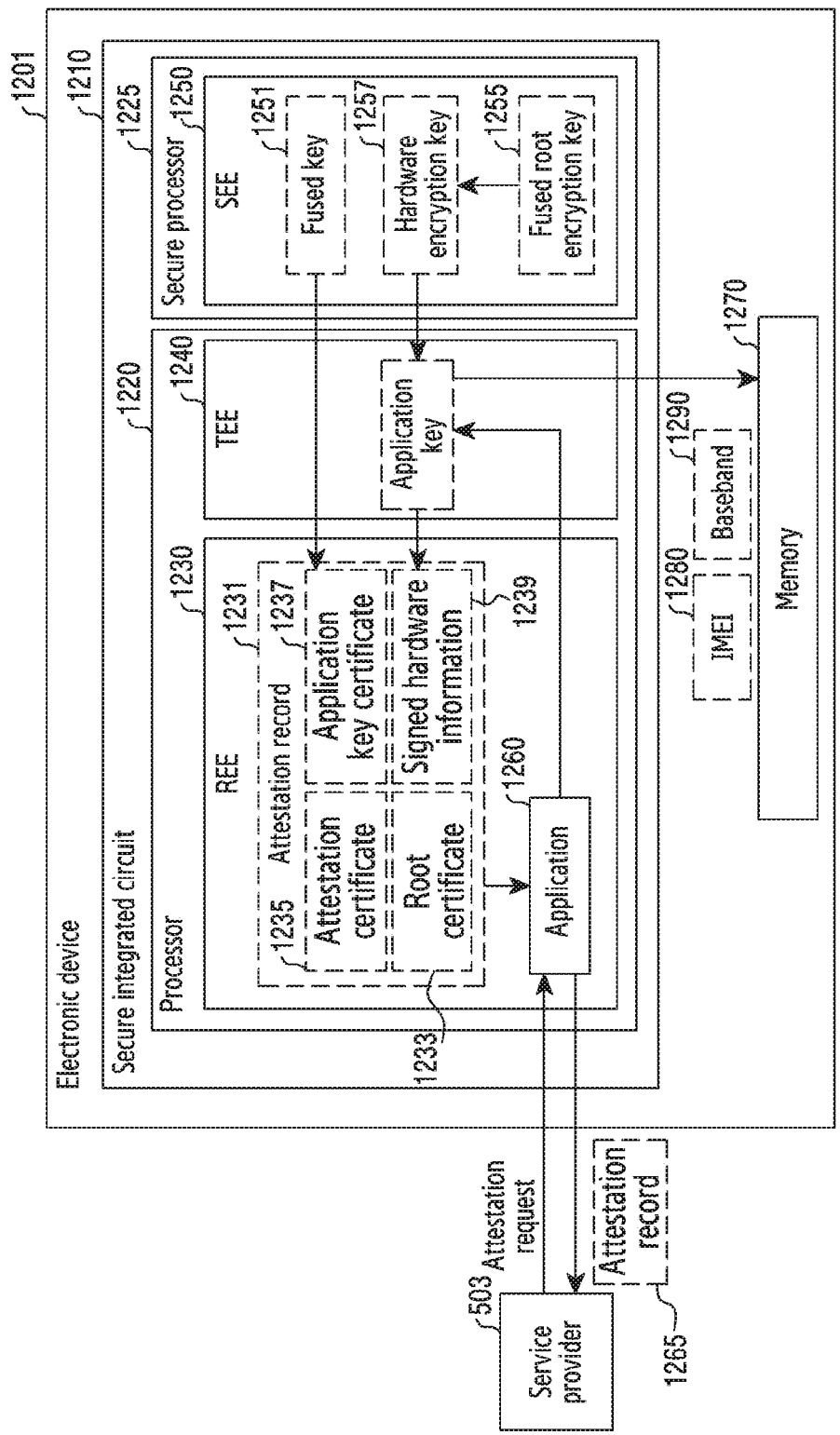
FIG. 12 is a block diagram of a method of generating an attestation record in an electronic device, according to an embodiment.

FIG. 12 is a block diagram of a method of generating an attestation record 1231 in an electronic device 1201, according to an embodiment.

The electronic device 1201 may correspond to the electronic device 201 of FIG. 2. The electronic device 1201 may receive an attestation request from a service provider 1203. The processor 1220 of the electronic device 1201 may receive an attestation request from the service provider 1203, via an application 1260 operating in a normal execution environment (an REE) 1230. The service provider 1203 may correspond to the server 108 of FIG. 1.

The attestation request may include a challenge generated by the service provider 1203. The challenge may be a value for identifying that the attestation record is generated in response to the attestation request from service provider 1203. The challenge may be a value generated by the service provider 1203.

The application 1260 may be an application provided by the service provider 1203. However, this is merely an example, and the application 1260 is not limited to an application provided by the service provider 1203.

In a TEE 1210, the processor 1220 may generate an application key 1245. In the TEE 1240, the processor 1220 may generate the application key 1245 in response to a request for generating an application key received from the REE 1230. In the TEE 1240, the processor 1220 may generate the application key 1245 using a random number generation module.

In the TEE 1240, the processor 1220 may generate signed hardware information. In the TEE 1240, the processor 1220 may collect hardware information in response to a request for generating signed hardware information from the REE 1230.

In the TEE 1240, the processor 1220 may sign the collected hardware information using the private key of the application key 1245. In the TEE 1240, the processor 1220 may sign the collected hardware information using the private key of the application key 1245, so as to generate signed hardware information 1239.

In the TEE 1240, the processor 1220 may transfer the signed hardware information 1239 to the application 1260 operating in the REE 1230.

In an SEE 1250, the secure processor 1225 may generate an application certificate 1237.

In the SEE 1250, the secure processor 1225 may collect information to be included in the application certificate 1237, in response to a request for generating an application certificate received from the REE 1230.

In the SEE 1250, the secure processor 1225 may sign the collected information using the private key of a fused key 1251. In the SEE 1250, the secure processor 1225 may sign the collected information using the private key of the fused key 1251, so as to generate the application certificate 1237.

In the SEE 1250, the secure processor 1225 may transfer the application certificate 1237 to the application 1260 operating in the REE 1230.

In the REE 1230, the processor 1220 may obtain a root certificate 1233 and an attestation certificate 1235 stored in the memory 1270. In the REE 1230, the processor 1220 may obtain the root certificate 1233 and the attestation certificate 1235 stored in the memory 1270, via the application 1260.

In the REE 1230, the processor 1220 may generate the attestation record 1231. In the REE 1230, the processor 1220 may generate the attestation record 1231, via the application 1260. In the REE 1230, the processor 1220 may generate the attestation record 1231 including the root certificate 1233, the attestation certificate 1235, the application certificate 1237, and the signed hardware information 1239.

In the REE 1230, the processor 1220 may transfer the attestation record 1231 to the service provider 1203.

The service provider 1203 may perform attestation of the electronic device 1201, based on the attestation record 1231 received from the electronic device 1201.

In the TEE 1240, the processor 1220 may encrypt the application key 1245, and may store the encrypted application key 1245 in the memory 1270. In the TEE 1240, the processor 1220 may encrypt the application key 1245 using an encryption module. In the TEE 1240, the processor 1220 may store the encrypted application key 1245 in the memory 1270.

In the TEE 1240, the processor 1220 may request encryption of the attestation key 1245 from the secure processor 1225. The secure processor 1225 may encrypt the application key 1245. The secure processor 1225 may generate a hardware encryption key 1257 using a fused root encryption key 1255. The secure processor 1225 may encrypt the application key 1245 using the generated hardware encryption key 1257. The secure processor 1225 may transfer the encrypted application key 1245 to the processor 1220. In the TEE 1240, the processor 1220 may receive the encrypted application key 1245, and may store the encrypted application key 1245 in the memory 1270.

Figure 13:
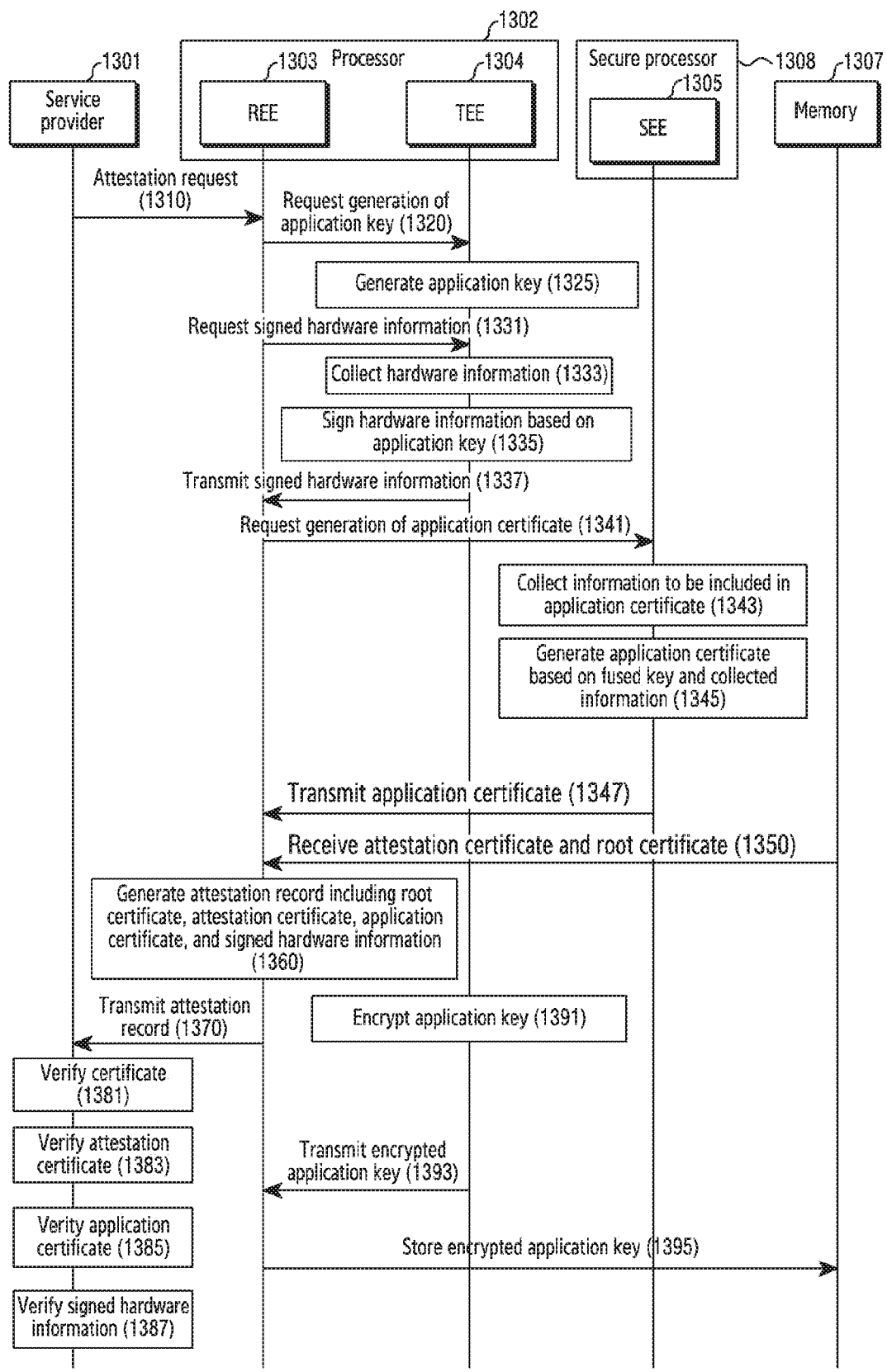
FIG. 13 is a flowchart of an operation of generating an attestation record in an electronic device, according to an embodiment.

FIG. 13 is a flowchart of an operation of generating an attestation record in an electronic device (e.g., the electronic device 1201) according to an embodiment. FIG. 13 will be described with reference to FIGS. 1, 2, and 12.

At step 1310, a service provider 1301 may transmit an attestation request to an electronic device (e.g., the electronic device 1201). A processor 1302 of the electronic device (e.g., the electronic device 1201) may receive the attestation request in a normal execution environment (an REE) 1303. The attestation request may include a challenge generated by the service provider 1301.

At step 1320, in the REE 1303, the processor 1302 may transfer an application key generation request to a TEE 1304.

At step 1325, in the TEE 1304, the processor 1302 may generate an application key. The application key may be implemented as an application key pair.

At step 1331, in the REE 1303, the processor 1302 may transfer a signed hardware information request to the TEE 1304. In the REE 1303, the processor 1302 may transfer the signed hardware information request to the TEE 1304, via the application 1260.

At step 1333, in the TEE 1304, the processor 1302 may collect hardware information. Hardware information may include an IMEI, model information, manufacturer information, a serial number, a hardware ID, baseband information, or a combination thereof. However, hardware information is not limited to the above-mentioned information, and may further include other information.

At step 1335, in the TEE 1304, the processor 1302 may sign the hardware information, based on the application key. The processor 1302 may sign the hardware information using the private key of the application key, via an encryption module (e.g., the encryption module 22) operating in the TEE 1304.

At step 1337, in the TEE 1304, the processor 1302 may transfer the signed hardware information to the REE 1303. In the TEE 1304, the processor 1302 may transfer the signed hardware information to the REE 1303, via the application 1260.

At step 1341, in the REE 1303, the processor 1302 may request generation of an application certificate from the secure processor 1308. In the REE 1303, the processor 1302 may request generation of an application certificate from the secure processor 1308, via the application 1260.

At step 1343, in an SEE 1305, the secure processor 1308 may collect information to be included in the application certificate. The information may include the state of the electronic device 1201. The information may include the integrity state of software (e.g., the program 140), the warranty state of software (e.g., the program 140), the integrity state of a kernel, the integrity state of running software, a result of comparison between hardware information included in an attestation certificate and hardware information at the point in time of attestation (e.g., at the point in time when a request for an attestation record is received), or a combination thereof. The information indicating the integrity state of software (e.g., the program 140) may be information indicating the integrity state of a software image (e.g., a bootloader, a kernel). The information indicating the warranty state may be information indicating whether software has been changed. The comparison result between hardware information included in an attestation certificate and hardware information at the point in time of attestation (e.g., at the point in time at which a request for an attestation record is received), may indicate whether the hardware information included in the attestation certificate and the hardware information at the point in time of attestation are identical to each other.

At step 1345, in the SEE 1305, the secure processor 1308 may generate an application certificate, based on the fused key 1251 and the collected information. In the SEE 1305, the secure processor 1308 may generate the application certificate 1237 by signing, using the fused key 1251, data including the collected information, the challenge, and the public key of the application key 1245.

At step 1347, in the SEE 1305, the secure processor 1308 may transmit the application certificate to the processor 1302. In the SEE 1305, the secure processor 1308 may transfer the signed hardware information to the application 1260 in the REE 1303.

At step 1350, in the REE 1303, the processor 1302 may receive an attestation certificate and a root certificate from the memory 1307. In the REE 1303, the processor 1302 may receive the attestation certificate and the root certificate from the memory 1307, via the application 1260.

At step 1360, in the REE 1303, the processor 1302 may generate the attestation record 1231 including the root certificate 1233, the attestation certificate 1235, the application certificate 1237, and the signed hardware information 1239.

At step 1370, in the REE 1303, the processor 1302 may transmit the attestation record 1231 to the service provider 1301. In the REE 1303, the processor 1302 may transmit the attestation record 1231 to the service provider 1301, via the application 1260.

At step 1381, the service provider 1301 may verify the root certificate. The service provider 1301 may verify the root certificate 1233 included in the attestation record 1231, using a root certificate previously stored in the service provider 1301.

At step 1383, the service provider 1301 may verify the attestation certificate 1235. The service provider 1301 may verify the attestation certificate 1235 included in the attestation record 1231, if the root certificate 1233 included in the attestation record 1231 is verified (trustable).

The service provider 1301 may verify the attestation certificate 1235 included in the attestation record 1231, using the public key of the root key included in the root certificate 1233. The service provider 1301 may verify the application certificate 1237 included in the attestation record 1231, if the attestation certificate 1235 included in the attestation record 1231 is verified (trustable).

At step 1385, the service provider 1301 may verify the application certificate 1237. The service provider 1301 may verify the application certificate 1237 included in the attestation record 1231, using the public key of the attestation key included in the attestation certificate 1231. If the application certificate 1237 included in the attestation record 1231 is verified (trustable), the service provider 1301 may identify the point in time at which the application certificate 1237 is generated, based on the challenge included in the application certificate 1237.

The service provider 1301 may compare the challenge included in the application certificate and a challenge at the point in time when attestation is requested, and may identify whether the application certificate is generated in response to the attestation request.

The service provider 1301 may verify the signed hardware information 1239 included in the attestation record 1231, if the application certificate 1237 included in the attestation record 1231 is verified (trustable), and the application certificate 1237 is identified as being generated in response to the attestation request.

At step 1387, the service provider 1301 may verify the signed hardware information 1239.

The service provider 1301 may verify the signed hardware information 1239 included in the attestation record 1231, using the public key of the application key 1245 included in the application certificate 1237.

If the signed hardware information 1239 included in the attestation record 1231 is verified (trustable), the service provider 1301 may identify the hardware information of the electronic device 1201, based on the result of comparison among the hardware information included in the signed hardware information 1239, the hardware information included in the attestation certificate 1235, and the hardware information included in the application certificate.

At step 1391, in the TEE 1304, the processor 1302 may encrypt the application key. The processor 1302 may encrypt the application key 1245 via the encryption module 22 operating in the TEE.

At step 1393, in the TEE 1304, the processor 1302 may transmit the encrypted application key to the REE 1303. The encryption module 22 operating in the TEE may transfer the encrypted application key to the application 1260 of the REE 1303.

At step 1395, in the REE 1303, the processor 1302 may store the encrypted application key in the memory 1307. The processor 1302 may store the encrypted application key in the memory 1307 using the application 1260.

According to the electronic device and an operation method thereof, as described above, a fused key of a secure integrated circuit of the electronic device may be used as an attestation key, and when the electronic device is manufactured, equipment (e.g., a hardware secure module) in a manufacturing line generates an attestation certificate based on the fused key and hardware information, and thus, it is secured that the attestation certificate is generated based on the corresponding secure integrated circuit.

According to the electronic device and an operation method thereof, as described above, the fused key of the secure integrated circuit may be usable in an SEE and thus, the security of the fused key from hardware/software attacks may be assured. Accordingly, it is difficult to generate a new attestation certificate using the fused key.

According to the electronic device and the operation method thereof as described above, when an application certificate is issued in response to an attestation request, the application certificate may include the state of hardware and software, and thus, a server that requests attestation may determine whether the electronic device is in a state appropriate for a security level.

As described above, the electronic device may include an integrated circuit including at least one key, at least one processor including the integrated circuit, and a memory operatively connected to the at least one processor, where the memory stores instructions that, when executed, cause the at least one processor to identify at least one piece of hardware information related to the electronic device, generate a signed certificate signing request including the at least one piece of hardware information, based on the at least one key, transmit the signed certificate signing request to an external electronic device, receive an attestation certificate generated based on the signed certificate signing request, from the external electronic device, and store the received attestation certificate in the memory.

The at least one key may include a private key and a public key corresponding to the private key, and the instructions, when executed, may further cause the at least one processor to generate a certificate signing request including the public key and the at least one piece of hardware information, and generate the signed certificate signing request by signing the certificate signing request using the private key.

The instructions, when executed, may further cause a secure processor operating in a secure execution environment among the at least one processor to sign the certificate signing request.

The at least one key may be accessed by a secure processor that operates in a secure execution environment among the at least one processor.

The at least one key may be stored in a fused state in the integrated circuit. The at least one key may be generated by the at least one processor, and may be stored in a secure memory included in the integrated circuit.

The at least one piece of hardware information may include an IMEI, model information, manufacturer information, a serial number, a hardware ID, baseband information, or a combination thereof.

The attestation certificate may be generated in the external electronic device by signing the certificate signing request using a root key.

The instructions, when executed, may further cause the at least one processor to receive an attestation record request from a server via an application running in the at least one processor, in response to the attestation record request, generate at least one other key, identify new hardware information related to the electronic device, sign the new hardware information using the private key of the other key, generate an application certificate including the public key of the at least one other key and a challenge included in the attestation record request, sign the application certificate using the private key of the at least one key, generate an attestation record including a root certificate stored in advance in the memory, the attestation certificate, the signed application certificate, and the signed new hardware information, and transmit the generated attestation record to the server.

The instructions, when executed, may further cause the at least one processor to generate the application certificate by including data indicating a comparison result between the new hardware information and the hardware information included in the attestation certificate in a designated field of the application certificate.

The instructions, when executed, may further cause the at least one processor to generate the application certificate by including data indicating an integrity state of software of the electronic device in a designated field of the application certificate.

The instructions, when executed, may further cause the at least one processor to encrypt the at least one other key, and store the encrypted at least one other key in the memory so that the encrypted at least one other key is used for a subsequent attestation record request.

A method of operating the electronic device 201 may include identifying at least one piece of hardware information related to the electronic device, generating a signed certificate signing request including the at least one piece of hardware information, based on at least one key, transmitting the signed certificate signing request to an external electronic device, receiving an attestation certificate generated in response to the signed certificate signing request, from the external electronic device, and storing the received attestation certificate in the memory.

The at least one key may include a private key and a public key corresponding to the private key, where generating the signed certificate signing request may further include generating a certificate signing request including the public key of the at least one key and the at least one piece of hardware information, and generating the signed certificate signing request by signing the certificate signing request using the private key of the at least one key.

Signing the certificate signing request using the private key of the at least one key may be performed by a secure processor that operates in a secure execution environment among at least one processor of the electronic device.

The at least one piece of hardware information may include an IMEI, model information, manufacturer information, a serial number, a hardware ID, baseband information, or a combination thereof.

The method may further include receiving an attestation record request from a server via an application that is running in the at least one processor, in response to the attestation record request, generating at least one other key, identifying new hardware information related to the electronic device, signing the new hardware information using the private key of the at least one other key, generating an application certificate including the public key of the at least one other key and a challenge included in the attestation record request, signing the application certificate using the private key of the at least one key, generating an attestation record including a root certificate stored in advance in the memory, the attestation certificate, the signed application certificate, and the signed new hardware information, and transmitting the generated attestation record to the server.

Generating the application certificate may further include, generating the application certificate by including data indicating a comparison result between the new hardware information and the hardware information included in the attestation certificate in a designated field of the application certificate.

Generating the application certificate may further include generating the application certificate by including data indicating an integrity state of software of the electronic device in a designated field of the application certificate.

The method may further include encrypting at least one other key, and storing the encrypted at least one other key in the memory.

Methods according to an embodiment of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The one or more program may include instructions that cause the electronic device to perform the methods according to an embodiment of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a CD-ROM, DVDs, or other type optical storage devices, or a magnetic cassette. Any combination of some or all of them may form a memory in which the program is stored. Further, a plurality of such memories may be included in the electronic device.

In addition, the programs may be stored in an attachable storage device which is accessible through communication networks such as the Internet, Intranet, LAN, WAN, and storage area network (SAN), or a combination thereof. Such a storage device may access the electronic device via an external port. Further, a separate storage device on the communication network may access a portable electronic device.

In the above-described example embodiments of the present disclosure, a component included in the present disclosure is expressed in the singular or the plural according to a presented example embodiment. However, the singular form or plural form is selected for convenience of description suitable for the presented situation, and an embodiment of the present disclosure are not limited to a single element or multiple elements thereof. Further, either multiple elements expressed in the description may be configured into a single element or a single element in the description may be configured into multiple elements.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined b the appended claims and equivalents thereof.

What is claimed is:

1. An electronic device, comprising:
   an integrated circuit including at least one key comprising a private key and a public key corresponding to the private key, wherein the private key is stored in a fused state in the integrated circuit;
   at least one processor including the integrated circuit; and
   a memory operatively connected to the at least one processor, wherein the memory stores instructions that, when executed, cause the at least one processor to:
   obtain at least one piece of hardware information related to the electronic device;
   generate a certificate signing request including the public key and the at least one piece of hardware information;
   generate a signed certificate signing request by signing the certificate signing request using the private key;
   transmit the signed certificate signing request to an external electronic device;
   receive an attestation certificate generated based on the signed certificate signing request, from the external electronic device;
   store the received attestation certificate in the memory;
   receive an attestation record request including a challenge from a server via an application running in the at least one processor;
   in response to the attestation record request:
   generate a signed application certificate using the application by signing an application certificate including the challenge with the private key stored in the fused state;
   generate an attestation record including the stored attestation certificate, a root certificate, the signed application certificate and new hardware information related to the electronic device; and
   transmit the attestation record to the server for verification of the electronic device.

2. The electronic device of claim 1, wherein the instructions, when executed, further cause a secure processor operating in a secure execution environment among the at least one processor to sign the certificate signing request.

3. The electronic device of claim 1, wherein the at least one key is accessible by a secure processor that operates in a secure execution environment among the at least one processor.

4. The electronic device of claim 1, wherein the at least one key is generated by the at least one processor, and is stored in a secure memory included in the integrated circuit.

5. The electronic device of claim 1, wherein the at least one piece of hardware information comprises an international mobile equipment identity (IMEI), model information, manufacturer information, a serial number, a hardware ID, baseband information, or a combination thereof.

6. The electronic device of claim 1, wherein the attestation certificate is generated in the external electronic device by signing the certificate signing request using a root key.

7. The electronic device of claim 1, wherein the instructions, when executed, further cause the at least one processor to:
   in response to the attestation record request:
   generate at least one other key;
   identify new hardware information related to the electronic device; and
   sign the new hardware information using a private key of the other key.

8. The electronic device of claim 7, wherein the instructions, when executed, further cause the at least one processor to generate the application certificate by including data indicating a comparison result between the new hardware information and hardware information included in the attestation certificate, in a designated field of the application certificate.

9. The electronic device of claim 7, wherein the instructions, when executed, further cause the at least one processor to generate the application certificate by including data indicating an integrity state of software of the electronic device in a designated field of the application certificate.

10. The electronic device of claim 7, wherein the instructions, when executed, further cause the at least one processor to encrypt the at least one other key, and store the encrypted at least one other key in the memory so that the encrypted at least one other key is used for a subsequent attestation record request.

11. A method of operating an electronic device comprising an integrated circuit including at least one key comprising a private key and a public key, a memory, and at least one processor including the integrated circuit, the method comprising:

identifying at least one piece of hardware information related to the electronic device;

generating a certificate signing request including the public key and the at least one piece of hardware information;

generating a signed certificate signing request by signing the certificate signing request using the private key, wherein the private key is stored in a fused state in the integrated circuit;

transmitting the signed certificate signing request to an external electronic device;

receiving an attestation certificate generated based on the signed certificate signing request, from the external electronic device;

storing the received attestation certificate in the memory, receiving an attestation record request including a challenge from a server via an application running in the at least one processor; and in response to the attestation record request:

generating a signed application certificate using the application by signing an application certificate including the challenge with the private key stored in the fused state;

generating an attestation record including the stored attestation certificate, a root certificate, the signed application certificate and new hardware information related to the electronic device; and transmitting the attestation record to the server for verification of the electronic device.

12. The method of claim 11, wherein signing the certificate signing request using the private key is performed by a secure processor that operates in a secure execution environment among the at least one processor of the electronic device.

13. The method of claim 11, wherein the at least one piece of hardware information comprises an international mobile equipment identity (IMEI), model information, manufacturer information, a serial number, a hardware ID, baseband information, or a combination thereof.

14. The method of claim 11, further comprising:

in response to the attestation record request, generating at least one other key;

identifying new hardware information related to the electronic device;

signing the new hardware information using a private key of the at least one other key.

15. The method of claim 14, wherein generating the application certificate further comprises:

generating the application certificate by including data indicating a comparison result between the new hardware information and hardware information included in the attestation certificate, in a designated field of the application certificate.

16. The method of claim 14, wherein generating the application certificate further comprises:

generating the application certificate by including data indicating an integrity state of software of the electronic device in a designated field of the application certificate.

17. The method of claim 14, further comprising:

encrypting the at least one other key; and storing the encrypted at least one other key in the memory.

\* \* \* \* \*